United States Patent [19]

Jensen et al.

[11] Patent Number: 4,954,670
[45] Date of Patent: Sep. 4, 1990

[54] CABLE SPLICE CASE

[75] Inventors: Michael L. Jensen, Overijse; Jean-Marie E. Nolf, Hamme-Mille; Jan Vansant, Leuven; Luiz N. Mendes, Begijnendijk, all of Belgium

[73] Assignee: Raychem Corporation, Menlo Park, Calif.

[21] Appl. No.: 274,722

[22] Filed: Nov. 9, 1988

Related U.S. Application Data

[63] Continuation of Ser. No. 18,221, Feb. 24, 1987, abandoned.

[30] Foreign Application Priority Data

Feb. 24, 1986 [GB] United Kingdom ................. 8604501

[51] Int. Cl.$^5$ ............................................. H02G 15/08
[52] U.S. Cl. ................. 174/92; 174/DIG. 8; 219/535
[58] Field of Search ............................ 174/92, DIG. 8; 219/535

[56] References Cited

U.S. PATENT DOCUMENTS

| | | | |
|---|---|---|---|
| 3,455,336 | 7/1969 | Ellis | 138/156 |
| 4,085,286 | 4/1978 | Horsma et al. | 174/92 |
| 4,209,352 | 6/1980 | Diaz et al. | 174/92 X |
| 4,219,051 | 8/1980 | D'Haeyer | 174/DIG. 8 X |
| 4,276,909 | 7/1981 | Biscop | 174/DIG. 8 X |
| 4,347,402 | 8/1982 | Reyners | 174/DIG. 8 X |
| 4,369,356 | 1/1983 | Tsurutani et al. | 219/535 |
| 4,466,846 | 8/1984 | Nolf et al. | 174/DIG. 8 X |
| 4,472,222 | 9/1984 | Moisson et al. | 174/92 X |
| 4,517,449 | 5/1985 | Chazan et al. | 174/DIG. 8 X |
| 4,518,448 | 5/1985 | Henry et al. | 174/DIG. 8 X |
| 4,532,164 | 7/1985 | Claunch, II et al. | 219/549 X |
| 4,532,168 | 7/1985 | Steele et al. | 174/92 X |
| 4,626,458 | 12/1986 | Pithouse et al. | 174/92 X |
| 4,675,512 | 6/1987 | Doucet et al. | 219/535 |
| 4,680,065 | 7/1987 | Vansant et al. | 174/DIG. 8 X |
| 4,734,543 | 3/1988 | Nolf | 174/DIG. 8 |

FOREIGN PATENT DOCUMENTS

| | | |
|---|---|---|
| 0196767 | 10/1986 | European Pat. Off. . |
| 2136739 | 2/1973 | Fed. Rep. of Germany . |
| 2943371 | 5/1980 | Fed. Rep. of Germany . |
| 2335078 | 7/1977 | France . |
| 1155470 | 11/1966 | United Kingdom . |
| 1164757 | 9/1969 | United Kingdom . |
| 1431167 | 4/1976 | United Kingdom . |
| 2028601 | 3/1980 | United Kingdom . |
| 1604986 | 12/1981 | United Kingdom . |
| 2132039 | 6/1984 | United Kingdom . |

Primary Examiner—Morris H. Nimmo
Attorney, Agent, or Firm—A. Stephen Zavell; Herbert G. Burkard

[57] ABSTRACT

A telecommunications splice case comprises a flexible sheet that can be wrapped around the splice and optionally further surrounded by a rigid casing. The sheet has a heat-activatable sealing material at its edge and an electrical heater for activation.

19 Claims, 17 Drawing Sheets

PRIOR ART

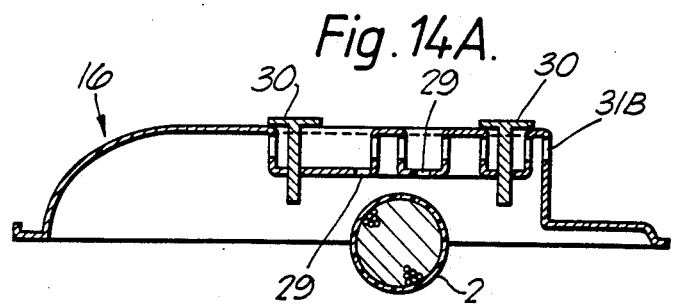
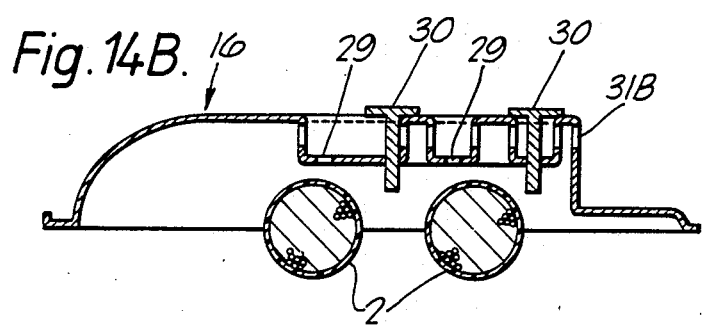
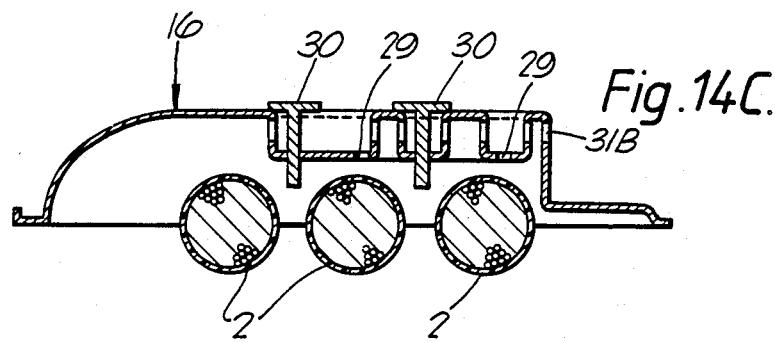
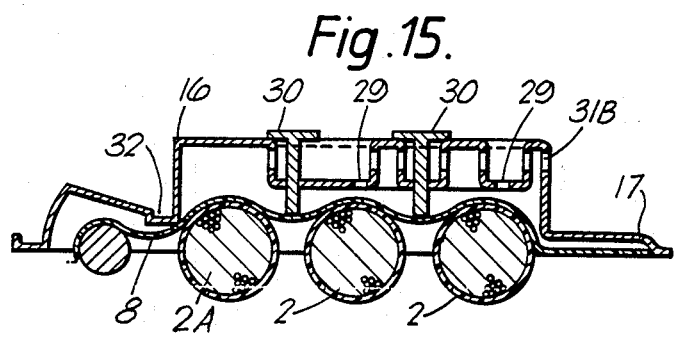

CABLE SPLICE CASE

This application is a continuation of application Ser. No. 07/018,221, filed 24 Feb. 1987.

The present invention relates to the environmental protection of objects such as cable splices, particularly telecommunications cable splice cases, especially by means that do not require a large input of energy for installation.

A cable splice is in general formed by removing insulation from the ends of the cables to be joined, splicing the conductors therein, and forming around the resulting splice bundle a covering, called a splice case, in order to protect the otherwise exposed spliced conductors. The splice case may be required to offer protection against water, water vapour, dirt and other contaminants and also against animial attack, and should have a life-time comparable to that of the cable insulation, typically at least 25 years. Many cables are internally pressurized to keep out water vapour or to provide a means of detecting leaks, and a splice case for such cables should also be pressure retaining.

One of the most successful and widely used designs of cable splice case is that marketed by Raychem under the trade marks XAGA and VASM. There, a heat-shrinkable polymeric sleeve is installed around the splice to be protected, and heat is applied to cause it to shrink down into engagement with the cables either side of the sleeve. A propane torch is usually used to apply the heat. In order to provide further mechanical strength and, where desired, to provide further resistance to water vapour penetration, an internal liner may be provided around the splice bundle, and the sleeve installed around the liner. Such a liner and sleeve are disclosed and claimed in GB 1431167 (N.V. Raychem S.A.). The shrinkable sleeve may be of the wrap-around form, in which case it may comprise a sheet of shrinkable material having a protuberance or rail running along each opposing longitudinal edge portion. These rails are brought together, thus turning the sheet into a cylinder, and secured together by means of a channel, C-shaped in cross-section, which is slid over the now abutting pair of rails. This design of sleeve is disclosed and claimed in GB 1155470 (Raychem Corporation).

The sleeve may be internally coated with a hot-melt adhesive to provide a bond between the sleeve and the cables and, where present, the liner. The step of heating not only causes heat-shrinkage of the sleeve, but also activation of the hot-melt adhesive.

Whilst this type of splice case is simple to install and has excellent performance, it has the disadvantage in requiring the use of a torch for installation. Where a cable to be spliced runs in, for example, a duct or manhole shared with gas pipes or where the object to be environmentally protected is itself a gas pipe the use of a torch is undesirable and may be forbidden.

Attempts have been made to overcome this problem by providing an electrical source of heat, although that too may be unacceptable if the voltage required is sufficiently high that a short could cause sparking. One electrical solution, which it is believed has not been adopted in practice, is disclosed in DE 2136739 (Siemens A.G.). That specification discloses a splice case comprising two semi-cylindrical thermoplastic half-shells hinged together along respective longitudinal edges. Thus, the splice case can be closed like a clam shell around the splice to be protected. Each half-shell has an end plate at each end thereof, each end plate having a specially shaped opening therein through which the ingoing and outgoing cables pass. The edges of each half-shell that will abut with those of the other half-shell when closed around a splice are provided with an electrical heating element.

These abutting edges are formed of thicker material than the remainder of the splice case, and the electrical heating element serves to weld them together.

A disadvantage of this design is that the half-shells are specially pre-shaped and can therefore deal with only a certain size of spliced cable. Furthermore, only a certain splice configuration, a simple in-line splice between two cables, can be accomodated. The end plates of the half-shells may have extra holes therein for small branching cables or drop wires, but the design is not suitable for a variety of branch-off configurations.

We have now designed a simple splice case that is applicable to a wide range of cable sizes and branch-off configurations and that requires little energy for installation.

Thus, the present invention provides a method of environmentally protecting an elongate substrate which comprises:
  positioning the substrate between a first sheet and a second flexible and substantially planar sheet such that the substrate extends out from the resulting double layer between a first edge portion of the first sheet and a second edge portion of the second sheet;
  providing a heat-activatable sealing material between the first edge portion and the second edge portion;
  activating the sealing material; and
  displacing the sealing material to form a seal between the first and second edge portions and the substrate.

The invention also provides an article (which may be supplied in kit form, but is preferably in one piece) for environmentally protecting an elongate substrate, which comprises:
a first sheet having a first edge portion;
a second flexible and substantially planar sheet having a second edge portion;
a heat-activatable sealing material that can be positioned between the first and second edge portions;
means for holding the first and second edge portions together and around the substrate; and
means for displacing the sealing material to form a seal between the first and second edge portions and the substrate.

By flexible we mean that the sheet can be deformed by wrapping folding or bending by hand, and by highly flexible that it can be deformed easily by hand. By substantially planar we mean that the sheet is not preformed such that it has a central body region and fixed shaped outlets that can accomodate only a single size and configuration of cables. The skilled man would in practice be able to make this distinction easily.

We prefer that electrical heating means is provided for activating, preferably softening the sealing material. The heating means preferably comprises a conductive polymer heater and is preferably self-regulating with respect to temperature. Operation of the heating means may, however, be controlled by the power supply or by the operator, for example by some switching operation that occurs after a certain period of time or after some change in the heater. In any case, we prefer that regulation occurs at a temperature between 100 and 140° C.

We also prefer that the heating means is in the form of a tape that runs at least between the first and second edge portions. The tape may be provided as part of the sheets along both said edge portions or along one only, or a single length of heater tape may be positioned between the edge portions during installation of the sheet. The tape or other heating means is preferably highly flexible, and therefore preferably thin, in order that the sheets be able to conform to the substrate they are environmentally to protect.

The first and second sheets may be joined together before use or may be integral parts of a larger sheet or may be separate before installation. We prefer they are integral parts of a larger sheet, which larger sheet may be wrapped around the substrate, for example by generally folding it in half, in the fashion of closing a newspaper, around the substrate. The part of the larger sheet on one side of the substrate may be regarded as said first sheet, and the part on the opposite side as said second sheet. The advantage of the first and second sheets being integral is that the edge which is formed by the fold line does not need to be sealed. We prefer that the first sheet, as well as the second sheet, is flexible and substantially planar.

A clamp or other closure means may be applied, optionally as part of said means for displacing, for holding corresponding edge portions of the first and second sheets together. In general, the first and second sheets will be substantially rectangular and the substrate will protrude out from opposite edges, preferably the short edges. One of the long edges will be formed by the fold line, and the other long edge will require sealing. The means for holding and the means for displacing referred to above act on the edges (or edge) from which the substrate protrudes, in this case the short edges. The long edges, if they require sealing, may be sealed in the same or in a different manner.

The article of the invention may additionally comprise a casing which may surround the splice and first and second sheets. Such casing may offer further mechanical protection, for example against impact and vibration damage and/or it may provide at least part of a means for holding and/or a means for displacing in respect of any edge portion of the sheets to be sealed. Preferably, such a casing provides protection against impact damage and holds together edge portions of the first and second sheet from which the substrate does not protrude (generally edge portions opposite a fold line and perpendicular to the edge portions from which the substrate does protrude). Alternatively, or in addition, some mechanical reinforcement may be provided around the splice between the sheets. Furthermore, engagement between the sheets and the casing may allow axial stress on the substrates to be transferred via the sheets (to which they are sealed) to the casing, thus in the case of a cable splice providing strain relief across the splice.

The casing may be reinforced by surface ribs, which ribs give the casing a generally better impact resistance. Alternatively, the casing proper could be oval, and have foam inserts which provide a cavity of the desired shape for the substrate.

The first and second sheets are substantially planar, at least before installation and preferably also after installation either side of the splice. After installation they may adopt a curved, preferably gently curved, configuration in order that they accommodate the splice bundle which will in general be more bulky than the cables it joins. This substantially planar nature may be contrasted with fully shaped rigid semi-cylindrical half shells and with Raychem's XAGA (trade mark) sleeves which although flexible are not highly flexible and which after installation adopt a generally tubular configuration that, due to heat-shrinkage, tapers down to the cables either side of the splice. Thus, the XAGA sleeves when installed have a generally circular transverse cross-section at all positions along their length. Whilst a splice case produced by the present invention may be somewhat bulbous at its centre, it will in general be substantially flat at it edges, particularly at the edges from which the cables protrude.

The sheets are preferably dimensionally stable, particularly are not heat-shrinkable, at least up to the appropriate installation temperature. They preferably comprise a polymeric material optionally together with a metal layer such as aluminium foil to reduce transmission of water vapour. A small extent of recovery may be provided in the direction that will be transverse to the elongate substrates, since shrinkage in that direction may help to reduce any voids adjacent the substrate. Recovery, however, will not generally be required in order to form a seal. This is of considerable benefit since the amount of energy required for installation is thereby reduced. Also, dimensional stability simplifies the design of the product, particularly where an electrical heater is provided as part of the product since dimensional change of the heater does not have to be provided for.

Sealing occurs by means of the sealing material, such as an adhesive, a gel or a sealant (such as a mastic), and especially a hot-melt adhesive. The sealing material is preferably provided only around edge portions of the sheet where a seal between edge portions and/or a seal between an edge portion and the protruding substrate is required for an environmental seal, ie to isolate the volume within the double layer of sheets from the outside. Thus, where the two sheets are integral, being part of a larger rectangular sheet that is folded substantially in half around the splice, the three edge portions to be sealed (the forth is a fold) are provided with the sealing material. The sealing material may be provided on the three edge portions of each sheet, on the three edge portions of one sheet only, partly on one sheet and partly on the other, or supplied as a separate component (for example as a strip of adhesive) that is inserted between the sheets at some stage during the installation procedure. The sealing material is preferably a different material from that of the sheets, but it may at least in part be integral with the sheets in which case a weld may be formed.

An advantage of localizing the sealing material at the edge portions or other areas where a seal is required, is that the energy required to soften, for example melt, the material is reduced due to a smaller amount of it being used. The temperature required to melt preferred adhesives, such as polyamide based adhesives, is generally lower than that to cause heat-shrinkage of the material usually used in this field, say 70–120° C. instead of 130–150° C. Thus, an article of the present invention can provide an excellent environmental seal using a much smaller amount of power for example from 20–150 watt hours over the size ranges generally encountered in the telecommunications cable field, compared with 30–300 watt hours for a fully heat-shrinkable and adhesive coated sleeve of the prior art design. Power consumption is preferably 1000–2000 watts, more preferably 1000 to 1700 watts, and maximum current inrush to the heater is preferably kept below 75 amps, preferably below 50 amps.

Where the article of the invention is to seal a branched splice (for example a splice where one cable is joined to two branching cables, which two cables leave the splice bundle substantially side-by-side) means may be provided to bring together between the branching cables edge portions of the first and second sheets. In this way voids between the branching cables and the first and second sheets may be reduced. A branch-off clip as disclosed and claimed in GB 1604986 (N.V. Raychem S.A.) may be used for this purpose. A branch-off clip, again optionally as disclosed in GB 1604986, may also be used either side of the branching cables to hold together the first and second sheets. In order that the sheets conform to the cables, or otherwise as desired, a high level of flexibility of the edge portions is preferred and this may limit the amount of adhesive. One way in which flexibility may be retained with much adhesive is to provide the adhesive in corrugated or ridged form with the corrugations or ridges running perpendicular to the direction in which bending is required.

The means for displacing the sealing material is preferably resiliently biased or capable of being resiliently biased to a form from which it can relax, and in relaxing cause displacement of the sealing material. The sealing material will flow under the force of the means for displacing into any voids which would constitute a leak path into the splice case which is being constructed. We prefer that the means for displacing is rendered resiliently biased after the first and second sheets have been positioned either side of the substrate. Various clips or clamps or other means that may be used to secure the two sheets with respect to each other and/or with respect to the substrate may serve to render said means resiliently biased. Once the sheets have been properly secured, the article of the invention may be heated. Heat may cause the sealing material to soften, and flow by reason of the relaxation of the means for displacing. Preferably the initial resistance of the cold sealing material to flowing and any clips and clamps etc. as mentioned above are all that prevent the means for deforming from relaxing, ie the means for deforming is not itself locked in its resiliently biased form. This need not however be the case, and the means for deforming may comprise a heat-recoverable member (for example a heat-recoverable part of one or both of the sheets) that on heating drives the softened sealing material. Another possibility is for the means for displacing to be locked in its resiliently biased form by a heat-softenable restraining means that is formed as a part thereof (for example a foam may be held compressed in a hot-melt adhesive).

In one embodiment, the means for displacing comprises a foam, preferably in strip form that runs along at least part of the first and/or second edge portion. At some stage, preferably during installation of the article of the invention, especially on insertion of clips and clamps that hold the first and second sheets relative to one another, the foam is compressed. On heating the edge portions, where the sealing material may be located, the foam can relax causing displacement of the softened sealing material. We prefer foam of a thickness of 0.5–3cm, especially 1.0–2.0 cms, and polyurethane foam has been found to be suitable. The foam may be covered with a polymeric film such as mylar or polyethylene, to aid installation of any clips or clamps as desired. Such a covering may also, or alternatively, serve to distribute the force of the clips or clamps (or any other means for holding or deforming the sheets such as the plate illustrated in FIG. 12d). A further use of such a covering may be to fix the foam with respect to an outer casing. The foam may be enclosed in a bag or partial bag of such a film material. Thus, the foam may have some function throughout the life of the product as well as or instead of during installation.

In a second embodiment, the means for displacing comprises fluid pressure, particularly gas (generally air) pressure, and preferably exerted through a bladder that is positioned at least at the edge portions of the first and/or second sheet. The sheets are positioned either side of the substrate and the fluid pressure is applied, which on softening of the sealing material is able to drive the sealing material into any voids between the first and second sheets and the substrate. We prefer that the fluid pressure is applied after the sheets have been secured relative to one another, although some pressure may be applied first, and further pressurization result from the clips or clamps etc used to secure the sheets.

Conveniently pressure may be applied, for example to a bladder at the edge portions, by means of a hand pump or by mouth. Alternatively, the bladder may contain, or be in communication with a container that contains, a gas-generating chemical reaction. Such a chemical reaction may be initiated by mixing the chemicals involved (for example by rupturing a barrier that previously separated them) or by heating. A single heating step, preferably by means of an electrical heater especially one provided as part of the article, may cause softening of the adhesive and pressurization of the bladder or other means for displacing. The heat required for softening the sealing material may, however, be supplied at least in part by an exothermic chemical reaction such as that used to provide the fluid pressure. In some cases simple thermal expansion of a gas within a bladder etc., or vapourization of a liquid, on heating may provide the desired pressure. Where a gas-generating reaction is provided in the bladder etc. the components thereof may solidify for example as an expanded foam on cooling, to serve to reinforce the product. One suitable reaction is generation of a polyurethane foam.

In a third embodiment, the means for displacing may comprise one or more spring clips or clamps which can exert a force on the edge portions of the sleeve, causing them to move progressively together as the sealing material softens. This is not however preferred since the force is more localized than in either of the above techniques.

Each of these techniques for ensuring that the sealing material fills voids adjacent the substrate avoids damage to the substrate that may result from some prior art attempts to ensure sealing material close to the cable forms a good seal. In order to produce a good seal, generally an adhesive bond, the sealing material must be properly heated and applied under some pressure to the surface to be sealed. Excessive heating, often required due to unreliable or incorrect pressure on the sealing material, can damage some substrates such as poor quality cables.

The article of the invention may be provided with means for aiding retention of pressure within it, and such means may be particularly useful where the article is to protect a joint between pressurized cables. The means may serve to reduce the extent to which a seal between the first and second sheets or between either sheet and the substrate is put, or to avoid such a seal being put, into peel by pressure within the resulting splice case. This may be done by providing one or both sheets with edge portions having a generally V-shaped (which includes U and other similarly shaped) tranverse cross-section. The apex of the V faces away from the inside of the splice case and the two limbs of the V are able to open up in response to pressure within the splice case. One limb of the V may comprise the first or second sheet proper, and the other limb may be sealed to the substrate or to the second or first sheet respectively. Thus, the sheet is provided with what is known in other contexts as a V-seal. Such a V-seal may be provided along all edges of one or both of the sheets that are to be sealed. The V-seal may be integral with the sheet (as in the explanation above) or may, initially at least, be separate, in which case one limb of the V may become sealed to one sheet and the other limb may become sealed to the other sheet. A release layer may be provided between the limbs of the V to prevent them becoming bonded together. The means for displacing the sealing material, for example the foam strip or bladder mentioned above, may be positioned between the limbs of the V.

During installation of the article of the invention it will in general be desirable for sealing material to be displaced in order that it seals any voids between the first and second sheets and the substrate which passes between them as it protrudes from the to be formed splice case. The edge portions of the sheets from which the substrate protrudes will generally be substantially linear over at least some of their length and they will lie one against the other. They must however part in order that one pass on one side and the other on the other side of the substrate as it passes between them. They will not follow exactly the periphery of the substrate (generally circular or oval in the case of a cable), and tent-shaped voids will remain adjacent the cables. It is these voids in particular into which the sealing material is to be displaced. Initially, for ease of manufacture and because the final position of the substrate may not be known in advance, the sealing material is preferably disposed uniformly along the first and/or second edge portions, especially in the form of a strip of adhesive. The means for displacing such as a foam strip or a bladder aligned along the length of the strip of adhesive will exert a pressure between the first and second sheets and between each sheet and the substrate. This will cause sealing material to be displaced into the tent-shaped voids referred to above, but it will also cause displacement into and out of the splice case, ie in a direction perpendicular to that desired. This may be acceptable, depending on the volume of sealing material present and on the size of the voids to be filled.

We prefer, however, that means be provided to control the direction in which softened sealing material is able to be displaced, preferably to limit displacement to a direction parallel to said first and second edge portions. Such means may comprise a guide, such as a ridge or other protuberance, that runs parallel to the edge portions preventing flow of sealing material in a perpendicular direction. The guide may be part of one or both sheets, part of the sealing material, or a separate component. In a preferred embodiment the guide comprises one or more strips of a foam or of a material, such as a mastic, that has a higher viscosity at the installation temperature of the article than that of the sealing material, or an inflatable air tube. A cloth or other mesh may be positioned at least temporarily, over the mastic to prevent anything prematurely sticking to it. The guide is therefore preferably deformable, but of sufficiently high viscoisty that it does not readily flow.

As mentioned above, we prefer that electrical heating means be provided for softening the sealing material. It is desirable that the heating means be provided with some form of regulation, and self-regulation with respect to temperature is preferred. The heating means may comprise a conductive polymer or other heater that has a positive temperature coefficient of resistance (PTC) such that when it reaches a certain temperature, or over a certain temperature range (the autotherm or switching temperature), its resistance increases significantly, thereby reducing its power output. We prefer that the heater is powered by a simple power supply, for example a battery of less than 50 volts, for example of 24 or 12 volts or through a simple AC power supply. A problem associated with some prior art PTC heaters is that their resistance on initial connection to a source of power is too low and hence a large in-rush current flows. This may damage the heater or the power supply. It is difficult to overcome this problem, particularly in the context of thin strip heaters as are preferred here, by chemical formulation of the PTC material of the heater.

We have therefore designed various new devices, useful as self-regulating or other heaters that can overcome problems of current in-rush whilst maintaining sufficiently high heat output at their operating temperatures, generally at or slightly below their autotherming or switching temperatures.

One such device comprises:
(a) a material comprising a PTC or NTC composition;
(b) at least two electrodes to which a source of electrical power may be applied to cause current to flow through the material; and
(c) means whereby a current path length through the material may be reduced as the temperature of the device increases.

A second such device comprises:
(a) a material comprising a PTC or NTC composition;
(b) at least two electrodes to which a source of electrical power may be applied to cause current to flow through the material; and
(c) means other than reversal of polarity of the source of electrical power whereby a direction of current flow in a region of the material may be made to alter through at least 90°.

A further such device comprises:
(a) a material comprising a PTC or NTC composition;
(b) at least two electrodes to which a source of electrical power may be applied to cause current to flow through the material:
(c) at least two zones through which current may pass; and
(d) means whereby interconnection of the zones with respect to the source of electrical power may be altered between series and parallel.

A fourth such device comprises:
(a) a material comprising a PTC composition in at least two zones;
(b) at least two electrodes to which a source of electrical power may be applied to cause current to flow through the device; and (c) a constant wattage composition interconnecting the two zones, the resistance of the constant wattage composition being from 0.1 to 10.0 times the geometric mean of the high and low resistances of the PTC composition.

A fifth such device comprises:
(a) a material comprising a PTC or NTC composition; and
(b) first, second and third electrodes arranged such that application of a source of electrical power to the first and third electrodes causes current to flow from the first electrode through the material to the second electrode and from the second electrode through the material to the third electrode;
the second electrode having a first surface adjacent the first electrode and a second surface adjacent the third electrode and an electrical connection between them, the first and second surfaces being of a size such that the maximum current density through the material via the second electrode is less than that for a direct passage between the first and third electrodes.

A sixth such device comprises:
(a) at least two terminal electrodes which can be connected directly to a power source;
(b) at least two intermediate electrodes which, when the two terminal electrodes are first connected to a power source, are at intermediate potentials; and
(c) at least one PTC or NTC element through which, when the two terminal electrodes are connected to a power source, current passes in one direction when the device is at one temperature and in a substantially different direction when the device is at a different temperature.

The device is preferably in strip from and comprises:
(a) a strip of material comprising a PTC or NTC composition;
(b) at least one strip electrode in sheet form in electrical contact with and running along one side of the material;
(c) at least two elongate electrodes in electrical contact with and running along the other side of the material, which two electrodes are preferably separated by a distance greater than the thickness of the material.

The electrical device, particularly said strip, preferably has a thickness less than 2.5 mm, more preferably less than 1.5 mm, especially less than 1 mm, to ensure flexibility. The device preferably has a heating capacity at steady state of 0.2 to 2.0, more preferably 0.5 to 1.4 watts per sq. cm, and less than 5.0, preferably less than 2.5 watts per sq. cm at inrush. These devices preferably self-regulate at a temperature between 100 and 140° C., more preferably between 115 and 130° C.

The following is a description of a novel power supply system.

Where the heater is to be powered from a battery, we prefer that a device be provided for holding batteries and which has provision for connection of the batteries to the heater and also provision for connection of the batteries to a source of electrical power for re-charging. The battery or batteries be rechargable from an automobile battery or charging system, or from the mains. Thus, the installer of the article of the invention can use the battery for installation and can recharge the battery on route to the next insulation job. The power supply therefore preferably comprises two or more batteries which can be connected in series to provide a higher voltage for installing the article of the inventon, and which can be connected in parallel (or individually) for re-charging. Thus three 8 volt (or 10 volts) batteries may be connected in series to provide 24 volts (or 30 volts) for installation, and in parallel allowing them to be charged from a 12 volt automobile battery or 14 volt automobile generator.

The overall power supply for the article of the invention preferably comprises a battery or battery pack, an energy control and a battery charger. The battery charger may be a separate holder that may remain for example in an automobile and be connected to its electrical system, for example through a cigarette lighter. The battery pack is then placed in the charger while the installer drives from one installation site to another. The charger can preferably accomodate at least two batteries or battery packs.

The energy control connects the batteries in series or parallel as desired. Preferably it has a voltage sensor to indicate to the installer when recharging is necessary. For example it may indicate three conditions, namely charged, sufficiently charged for installation of one further article, and recharging required. The indicator may be in the form of light-emitting diodes, for example green, yellow and red for the above three conditions. The energy control may also be provided with a timer to limit the time the batteries are connected to the article of the invention, or with other power control functions.

We prefer that the article of the invention be such that the total energy required each day by the installer is less than 50%, especially less than 20%, preferably about 10% of a 70 amp hour car battery. An automobile charging system should be able to cope with this additional load. This preferably allows, say, up to 6 articles of the invention to be installed. Where the article of the invention is to seal a telecommunications cable splice, we prefer that about 4 of the widely used smaller (A) sizes be installable with this total amount of power, or 3 of the B sizes, 2 of the C sizes or one D or E size. The ambient temperature will have an effect, and the above figures preferably hold to about 20° C.

Some means, such as a diode, is preferably provided to prevent current flowing from the battery pack to the automobile at low automobile battery voltage, eg when starting. The invention is further illustrated with reference to the accompanying drawings, in which:

FIGS. 13-15 show a casing according to the invention;

Figure 1A:
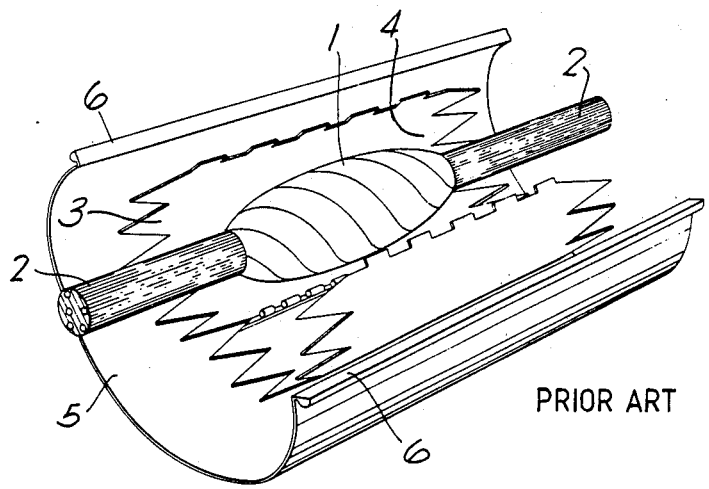
FIGS. 1a and 1b show a prior art splice case for a telecommunications cable.
Figure 1B:
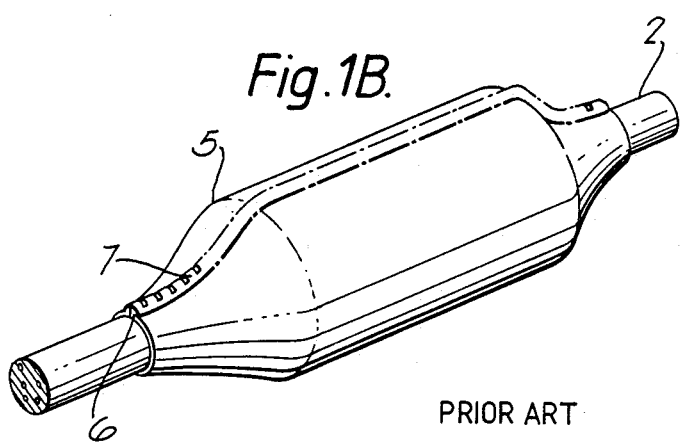
Figure 25:
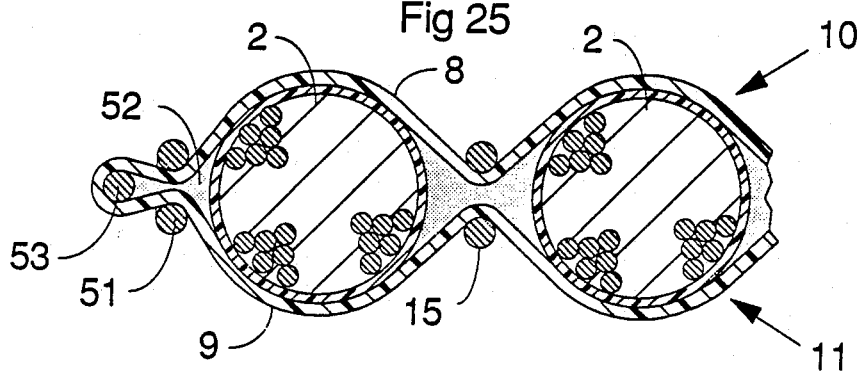

FIG. 25 shows an edge clip. FIGS. 1a and 1b show one of the most widely used prior art telecommunication cable splice cases. It is marketed by Raychem under the trade marks XAGA and VASM. A cable splice 1, which may be quite bulky due to the presence of a large number of conductor connectors, joins two cables 2. A liner 3 is wrapped around the splice in order to provide mechanical protection and optionally a water-vapour barrier. The liner 3 may have crowned ends 4 which can be deformed to taper down from the large central diameter to the diameter of the cables. The liner shown is in two parts, but it may comprise a roll of stiff material that is wrapped around the splice 1. The splice case is completed by a heat-shrinkable polymeric sleeve 5 that is wrapped around the liner and secured in its wrapped around configuration by bringing together rails 6. The sleeve is then shrunk by applying heat, generally using a propane torch, to engage the cables 2 and the liner 3.

The installed configuration is shown in FIG. 1b, which also shows a channel 7 that has been slid over the rails 6 to hold them together.

The sleeve 5 is coated on its internal surface with a hot-melt adhesive which is activated during the heating step mentioned above. A bond is therefore formed along the edges of the sleeve to form a seal between the rails 6, and also around the cables 2 where they leave the sleeve 5. In this way an excellent environmental seal is formed around the splice 1.

A significant amount of energy is required to install such a splice case, particularly to cause heat-shrinkage of the necessarily rather thick sleeve (the sleeve must offer considerable mechanical protection), and also to activate a large area of adhesive. As a practical matter application of heat has to be by means such as a propane torch due to the large amount of energy required and because the changing configuration of the sleeve 5 makes heat transfer difficult if a heater in contact with the sleeve is used.

Figure 2A:
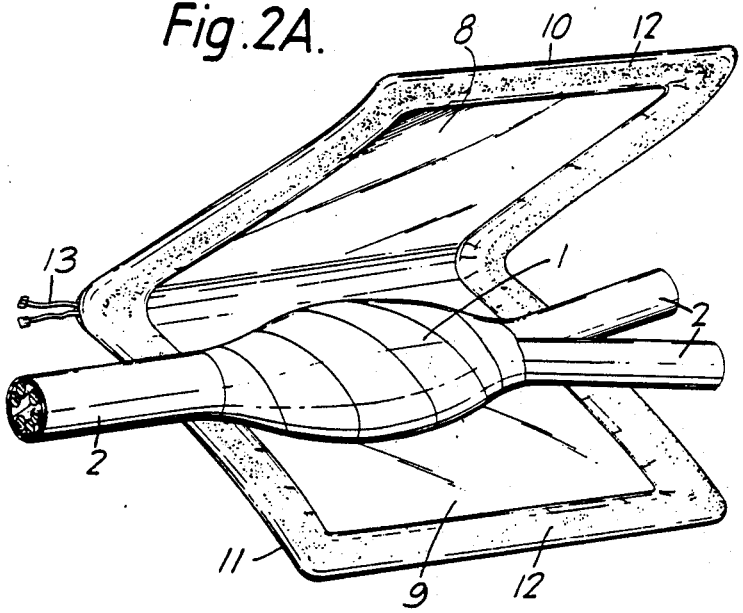
FIGS. 2a and 2b show an article of the invention.
Figure 2B:
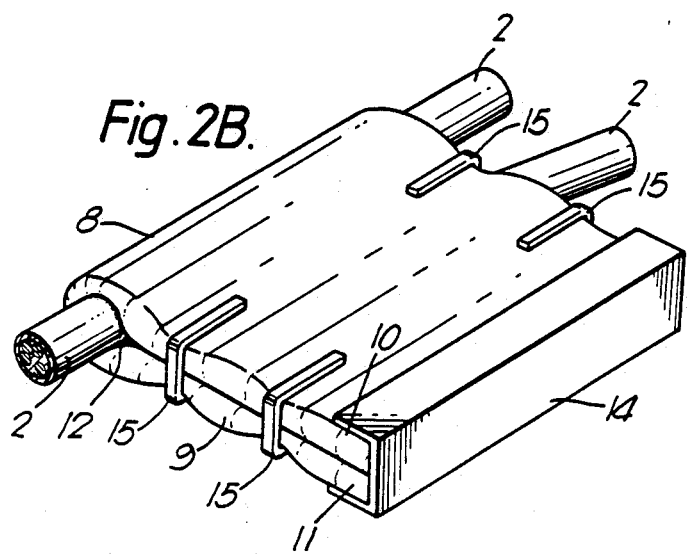

A totally different approach is shown in FIGS. 2a and 2b, which illustrate the invention.

The substrate to be environmentally protected again comprises a cable splice 1 joining cables 2, but here a branch splice is shown, two cables being joined to one cable.

The cable splice 1 is positioned between a first sheet 8 and a second flexible and substantially planar sheet 9. In this case the two sheets 8 and 9 are integral parts of a single larger sheet, which is folded in the fashion of closing a newspaper around the splice 1. Also, in this case both sheets are flexible and substantially planar.

Sheet 8 has a first edge portion 10 and sheet 9 has a second edge portion 11 between which the substrate (here a cable 2) extends. The sheets have such edge portions around three of their sides, the fourth side being a fold line of the larger sheet of which they are a part.

A heat-softenable material 12 is shown at the edge portions, such that it can form a seal between them when the sheets 8 and 9 are brought together. An electrical heater (not shown) in strip form runs along the edge portions (of one or both sheets 8,9) and is powered through conductors 13. The heater serves to activate the adhesive 12, thereby forming the desired seal.

In FIG. 2b the two sheets 8 and 9 have been brought together with the substrate between them. The longitudinal (with respect to the substrate) edge portion of the two sheets may be held together by means of a clamp 14. The clamp 14 is shown here as a simple one piece device, but it could have two or more parts that can move together to force the edges of the sheets together.

The transverse edge portions ie the first and second edge portions 10,11 and those at the opposite edge portions may be held together by a clamp such as clamp 14, but we prefer narrower clamps or clips 15. Such a clip 15 may be used as a branch-off clip between the branching cables, and also at other regions as shown.

When the two sheets have been brought together heat is applied to cause the sealing material to become activated and the sealing material is displaced to form a seal between the first and second edge portions, and preferably also between the other edge portions illustrated. Thus, the sealing material is displaced to fill any voids that would otherwise result in a leak path into the splice case being formed. In particular tent shaped voids adjacent the cables may require displacement of sealing material to become sealed. One such tent-shaped void is shown in FIG. 2b filled with sealing material 12.

We prefer that the sealing material is heat-softenable, so that on heating its reduced viscosity or increased softness allows it to be displaced. It may however be displaced before heating, or before complete heating, and subsequently be activated.

The sealing material may be displaced by the clamp 14 and clips 15, in which case the clamp and clips are or can be made resiliently biased to a configuration in which they force the sheets 8 and 9 together. We prefer however that the clamp and clips be substantially rigid and that some means for displacing the sealing material be provided along the edge portions, for example a foam strip or inflatable bladder.

In FIG. 2b the sheets can be seen to have a slightly non-planar shape corresponding to the shape of the splice and cables they surround. Nonetheless, they are substantially planar when compared to the prior art design illustrated in FIG. 1b. Also, the edge portions 10 and 11 through which the cable 2 extends can be seen to be substantially linear, in spite of the curve around the cable, when compared to the end of the splice case of FIG. 1b.

Figure 11:
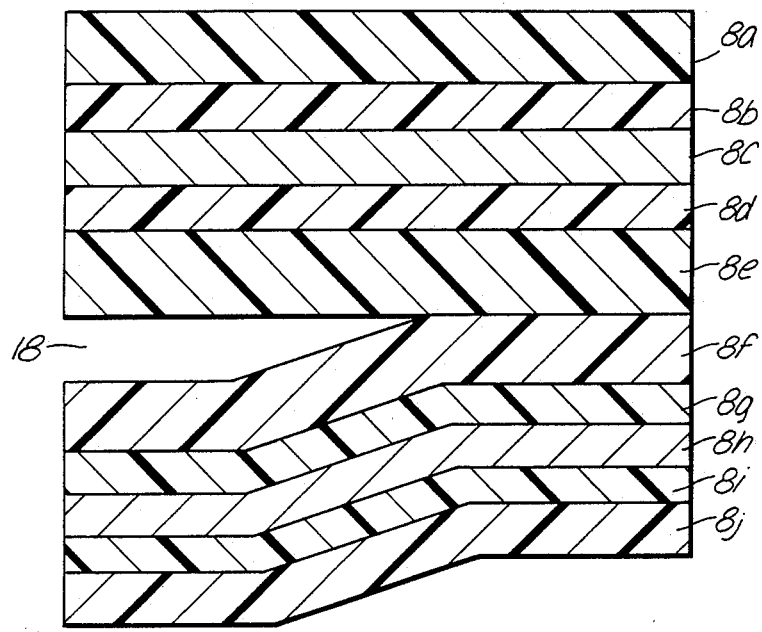
FIG. 11 shows a construction of a laminate for an article of the invention.

The sheets may be formed from any suitable material, but we prefer that it comprises a laminate of one or more layers of a polymeric material, optionally with one or more layers of a metal foil, such as aluminium as a moisture-vapour barrier. One possible material is polyethylene, optionally with up to 10%, preferably up to 5% ethylene vinylacetate for improved heat sealability. Since we prefer the sheets to be highly flexible, we prefer that other layers be included for added strength since a sufficiently strong polyethylene sheet would be rather thick. Other layers may include mylar or nylon etc. (A preferred laminate is illustrated in FIG. 11 below.)

A part of the sheet or a separate flap that acts as the short limb of a V-seal (to be described in detail below) may comprise a similar laminate to that set out above, or may have a layer chosen for ease of bonding and facing the cable or other sheet to which it will be bonded in the field. Such other layer may comprise a copolymer, of for example, ethylene vinylacetate and have a thickness 10–200, preferably 10–50 microns. The polyethylene is preferably linear low density polyethylene.

Other suitable materials include nylon and polypropylene and ethylene vinylacetate. The sheet may be heat-shrinkable.

The sheets may have considerable strength which may provide some strain relief across the cable splice. Clips or other devices or friction or an adhesive may be used to transmit stress from the sheets to an outer casing.

Figure 3:
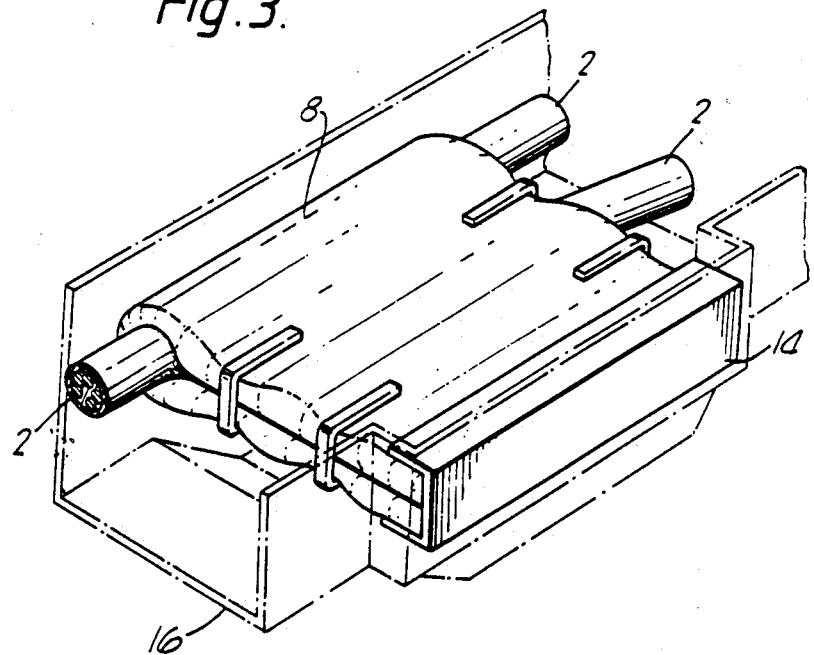
FIG. 3 shows a article of the invention together with a casing.

Environmental protection may be improved by the addition of a casing which may surround the sheets 8 and 9. Such a casing may serve as a rock guard etc and/or provide thermal insulation during installation, and may be formed as two parts, one of which is shown in dotted outline in FIG. 3 as 16. A similar part may be provided above sheet 8 and joined to the part 16 by a snap fit or by catches or by a hinge etc. The clips may be fixed to the casing such that they can be slid into position over the sheets 8 and 9.

The casing may be formed from any suitable material by any suitable technique. We prefer, however, that it comprises a polymeric material, such as acrylonitrile butadiene styrene (ABS) copolymer, polyethylene or polypropylene, and is blow moulded, injection moulded or vacuum formed.

Figure 4:
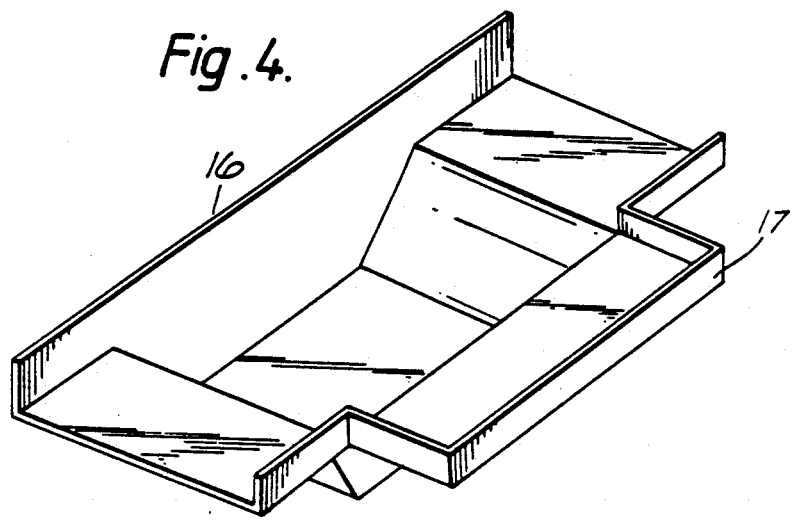
FIG. 4 shows an alternative design of casing.

A slightly different casing half 16 is shown in FIG. 4. Here a surface 17 is provided onto which longitudinal edge portions of the sheets 8 and 9 may rest. When the casing half 16 and a similar other half are brought together the two surfaces 17 are able to hold the longitudinal edges of the sheets together. Thus, the clamp 14 of FIG. 2b may but need not be dispensed with. The longitudinal edges (or one of them) may be reinforced with some reinforcing means, for example a rigid or semi-rigid strip, and such means may engage surface 17, for example by means of studs on one engaging holes in the other. The two casing halves may be separate before use, or they may be hinged along one edge. The sheets 8 and 9 may be pre-installed in one or both casing halves, for example by being bonded thereto. In this case the resulting one-piece article merely has to be closed around the cable splice and heated, after applying any clips 16 as shown in FIG. 2b, or other means for holding the two sheets closely together around the substrate if required.

Figure 5A:
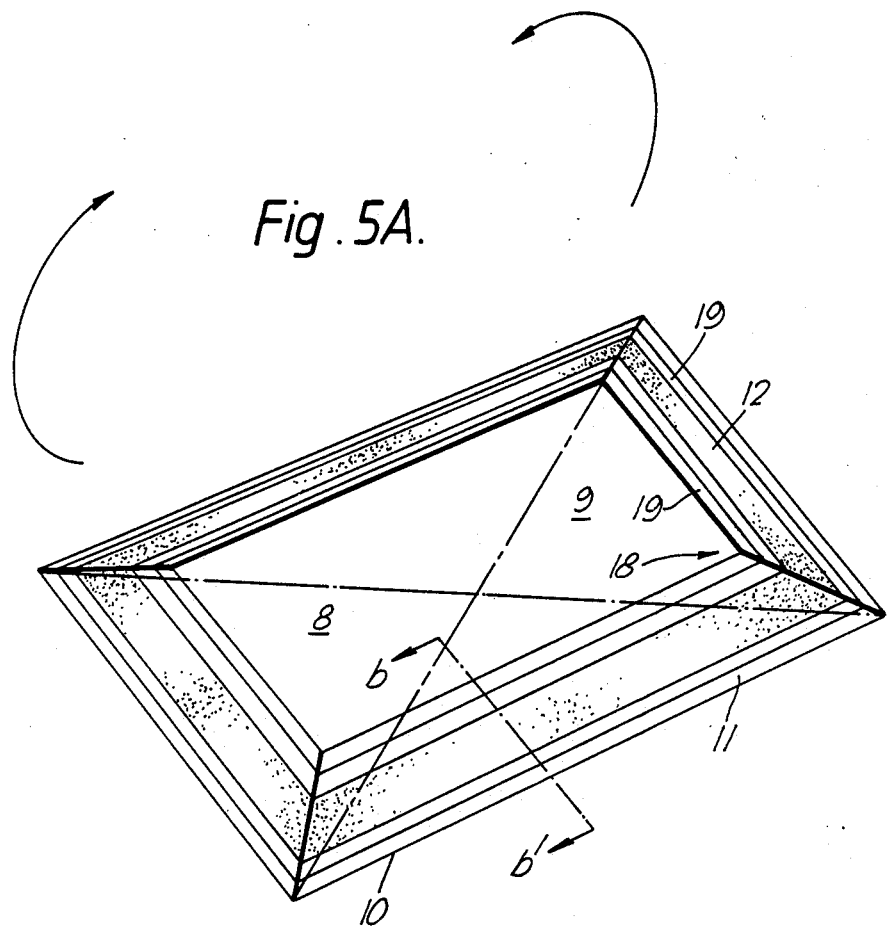
FIGS. 5a and 5b show an article of the invention.
Figure 5B:
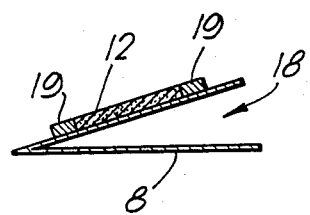

FIGS. 5a and 5b show means for aiding retention of pressure within the splice case. Here the means for aiding pressure retention is able to reduce the extent to which a seal between sheets 8 and 9 and between the sheets and the cables is put into peel by internal pressure. The means comprises a V-seal 18 along the edge portions of the sheets. The V-seal comprises two limbs, one of which is provided by the sheets 8 and 9 proper, and the other limb is formed from the sheets being folded over at their edge portions. The upper and lower limbs may be integral with one another, the V-seal then being formed by folding a single piece of material. Alternatively, two pieces of material may be bonded together; such a bond, unlike the bond between sheets 8 and 9 etc., need not be in danger of failure by peel since it may be made under controlled conditions in the factory, rather than under difficult conditions in the field. The V-seal 18 is shown running along all edges of the sheets, but it need only be present around the edges of one sheet. One limb of the V-seal 18 will become bonded to the cable and to the corresponding limb of the other V-seal. The V-seal will be able to open out in response to internal pressure. The sheets 8 and 9 are of course installed by wrapping around a splice by folding as indicated by the arrows.

A cross-section through a V-seal is shown in FIG. 5b, taken along the line B—B$^1$ of FIG. 5a.

An adhesive 12 is shown, located between means 19 for controlling the direction in which the sealing material is dispaced during installation of the article. The intention is that sealing material be displaced substantially along the edge portions, rather than into or out of the splice case. Means 19 may comprise a foam or a sealing material of higher viscosity than the functional sealing material 12, for example it may comprise a mastic.

Figure 6A:
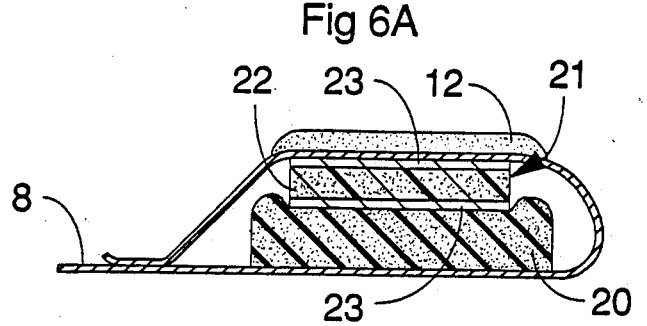
FIGS 6a, 6b and 6c show cross-section through parts of an article of the invention.
Figure 6B:
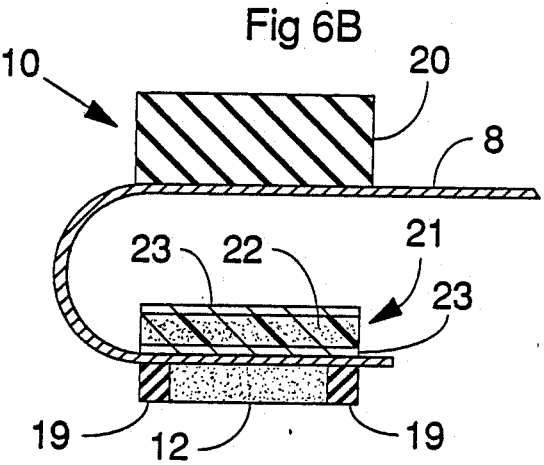
Figure 6C:
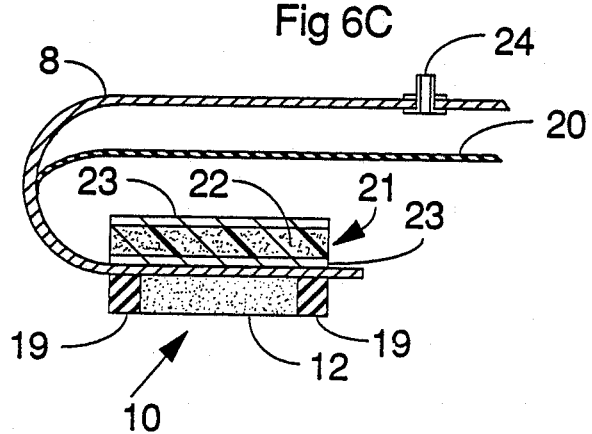

Various alternative edge portions to the sheets 8 and 9 are shown in FIGS. 6a, 6b and 6c.

FIG. 6a shows an edge portion 10 provided with a means 20 for displacing sealing material 12. When the article of the invention is installed the means 20 maybe or may become resiliently deformed such that on relaxing it displaces the sealing material. A heater 21 is also provided, preferable an electrical heater comprising a conductive polymer composition 22 and electrodes 23 by means of which a current can be made to flow through the composition 22. The means 20 may for example comprises a foam.

In FIG. 6b the sealing material 12 is shown localized by strips of a foam or other material 19, and the heater 21 is positioned within a V-seal.

In FIG. 6c the means 20 for displacing comprises a bladder that can be pressurized in order to cause displacement of the sealing material 12. The bladder may be in strip form, preferably running along the edge portions of the sheets 8 and 9, or it may be more extensive.

A valve 24 is shown in the sheet 8 for pressurization or pressure testing of the splice case. If the bladder extends across the entire sheet 8, it may be pierced after installation so the valve 24 can communicate with the inside of the splice case. The bladder may be pressurized by a gas-generating, such as a foaming chemical, reaction and this may be particularly applicable to an embodiment where the bladder extends over substantially all of the area of the sheets, particularly each sheet. In this case the products of the reaction may set hard, giving the sheets much mechanical strength. An outer casing need not then be provided.

Figure 7:
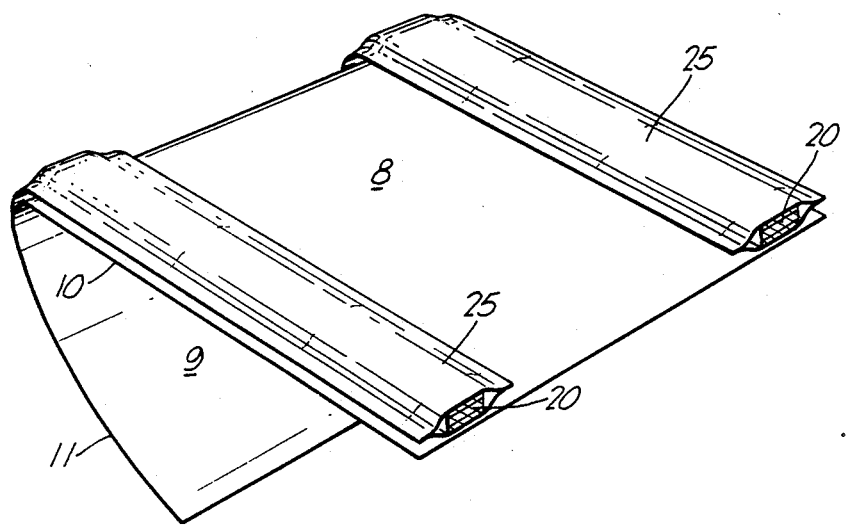
FIG. 7 shows a perspective view of an article of the invention.

FIG. 7 shows foam strips or other means for displacing 20 located within bags 25 of flexible material, bonded to the sheets 8 and 9, at edge portions 10 and 11. The foam strips may be located by sheets of flexible material that simple overlay them. The bags 25 may help to locate the sheets 8,9 to an outside casing, and may help to give the overall structure mechanical strength.

Figure 8A:
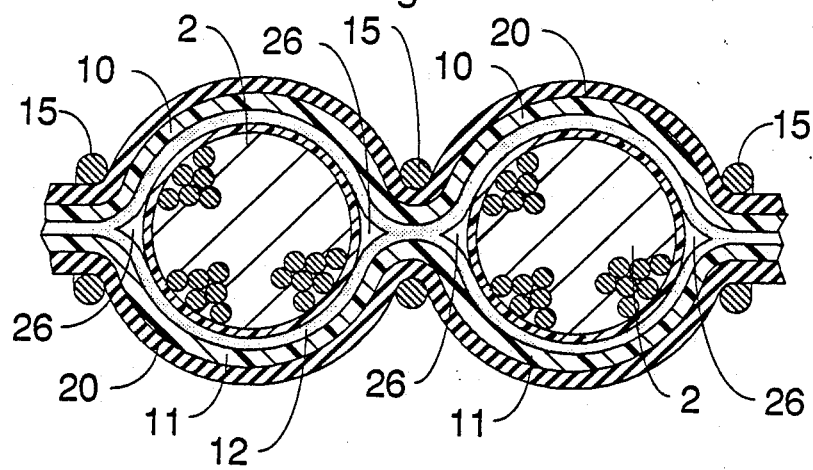
FIGS. 8a and 8b show the action of a means for displacing sealing material.
Figure 8B:
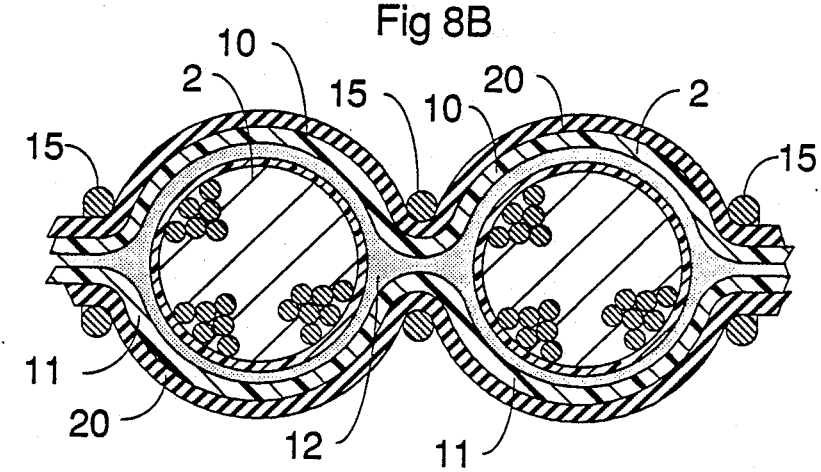

The effect of the means for displacing the sealing material may be seen in FIGS. 8a and 8b. Here the means for displacing comprises a foam or a pressurized bladder 20. The edge portions 10 of the sheets are caused to conform approximately to the substrates 2 by means of clips 15. Nonetheless, tent-shaped voids 26 may remain. FIG. 8a shows the situation before an adhesive 12 has been heat-softened. After heating, the softened adhesive is displaced, as the means 20 relaxes, to fill and seal the tent-shaped voids 26 adjacent the cables. The softened adhesive may act as a lubricant allowing the radially compressive effect of the foam to act uniformly.

Figure 9:
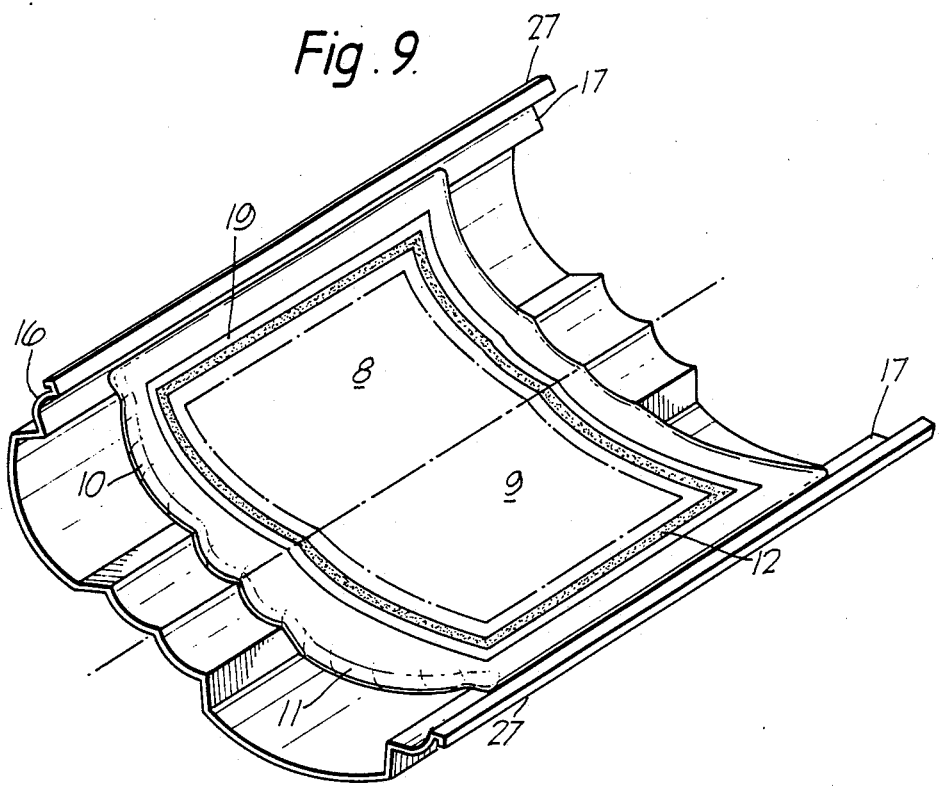
FIG. 9 shows a one-piece article.

FIG. 9 shows a one-piece article comprising sheets 8 and 9 for sealing and an outer casing 16 for further mechanical protection. The sheets 8 and 9, preferably integral with one another, are bonded (for example using a pressure-sensitive adhesive) or mechanically fixed within the casing 16, preferably along at least surfaces 17. The casing comprises two halves that are hinged together along the dotted line, for example by means of a live hinge. The article is thus placed around a cable splice and hinged closed. This considerably simplifies installation procedure. The action of closing the casing 16 around the splice may be sufficient to hold edge portions of the sheets 8 and 9 together while an adhesive 12 is activated. As before, means 19 is provided to encourage the adhesive 12 to be displaced along the edge portions rather than perpendicular to them. The sheets 8 and 9 may be fixed to the casing 16 in such a way that they can be removed from it in the field, for example to facilitate re-entry ie. subsequent access to the sealed substrate. Re-sealing could be carried out with the old casing and new sheets 8 and 9.

The casing 16 has surfaces 17 on which the longitudinal edge portions may rest, such that when the two halves of the casing are brought together the longitudinal edge portions are forced together. Other parts of the casing 16 may have a similar effect on the transverse edge portions 10 and 11, or separate clips or other devices may be used as illustrated in FIGS. 8a and 8b.

Edge portions 27 of the casing 16 may be shaped (as illustrated) or provided with means whereby they can be held together. A channel, such as channel 7 of FIG. 1b, may be used over the shaped edge portions. Alternatively, or additionally, tie wraps may be provided around the casing.

Figure 10:
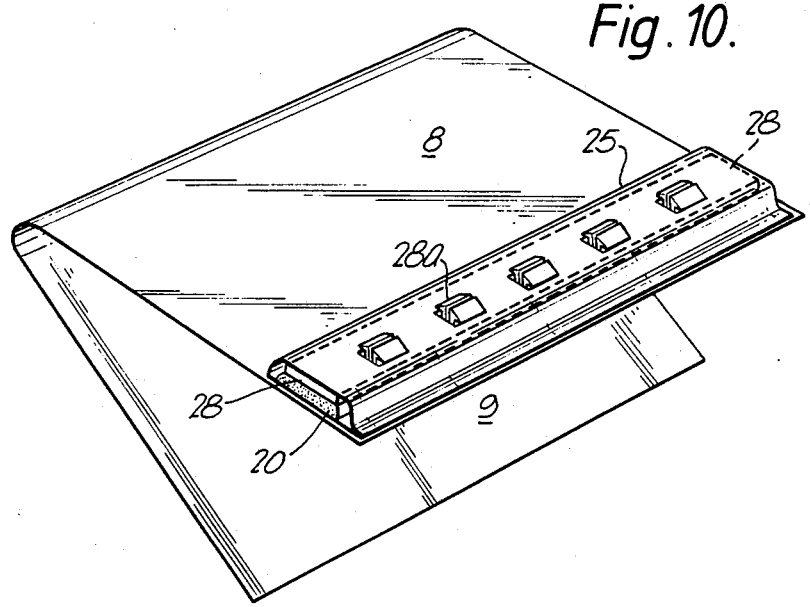
FIG. 10 shows an article of the invention with an edge fixing strip.

Sheets 8 and 9 (or one of them) may be provided with some further means for location with respect to a casing 16. An example of such further means is shown in FIG. 10, as a locating strip 28. The locating strip 28 may be positioned in a bag 25, overlying a foam strip 20. The locating strip 28 may have means 28a, such as snap-fit catches, protruding through the bag 25. The means 28a may engage holes in a surface 17 of a casing 16 such as illustrated in FIG. 9. This locating strip 28 may serve to hold the sheets 8,9 and the casing 15 together during installation of the product and/or it may have a function during service life of the product in improving sealing and/or mechanical strength.

A preferred structure of the sheets 8,9 is shown in FIG. 11. An edge of each sheet (which may be the same or different) is shown, a V-seal 18 being visible (see FIG. 5). The layers illustrated are preferably as follows:

8a: Polyethylene preferably high density, 25–500 microns, preferably 25–100 microns, 8b: Mylar or nylon, 5–50 microns, preferably 5–30 microns, 8c: Aluminium 5–30 microns, preferably 9–20 microns, 8d: Mylar or nylon, 5–14 30 microns, preferably 9–20 microns, 8e: Polyethylene preferably linear low density, 25–500 microns, preferably 25–100 microns, 8f: Polyethylene preferably linear low density, 25–500 microns, preferably 25–100 microns, 8g: Mylar or nylon, 5–50 microns, preferably 5–30 microns, 8h: Aluminium, 5–30 microns, preferably 9–20 microns, 8i: Mylar or nylon 5–==microns, preferably 5–30 microns, 8j: Ethylene vinylacetate copolymer, 5–100 microns, preferably 25–70 microns (and similar copolymers or nylon).

"Mylar" is a trade name for polyester, and in general any suitable polyester (particularly one having a melting point above 150° C. especially above 175° C.) may be used.

The various layers preferably are, but need not be bonded together.

The copolymer layer 8j is provided to aid bonding of a hot-melt coating to the laminate. Such a layer need not be provided to aid bonding of the two halves of the V-seal together (ie. between 8e and 8f) since this may be done in the factory under ideal conditions, and is preferably done by welding. Materials other than ethylene vinyl acetate copolymer may be used as a layer 8j, and in general any material with suitable adhesive properties may be used.

Fewer (or more) layers than those set out above may be used. In general, we prefer each sheet to have an outer surface that is puncture and tear resistant, resistant to internal pressurization of the article and preferably chemically resistant and self-extinguishing in the event of contact by spark or flame. High density polyethylene and similar materials are suitable. An inner surface should be capable of being bonded to the cables or other sheet in the case of a layer 8j, or capable of being bonded or welded to another half of a V-seal in the case of a layer 8e. We also prefer that each sheet have some intermediate layer (here 8c and 8h) that provides a moisture vapour barrier and/or can act as an electrical safety device. A metal layer, especially aluminium is suitable for both purposes. (An electrical safety device is explained in connection with FIGS. 22 and 23.) Each sheet may therefore comprise a laminate of: polymeric material, aluminium, polymeric material.

Additional layers may include heat-activatable or other adhesive or sealant coatings etc.

Figure 12D:
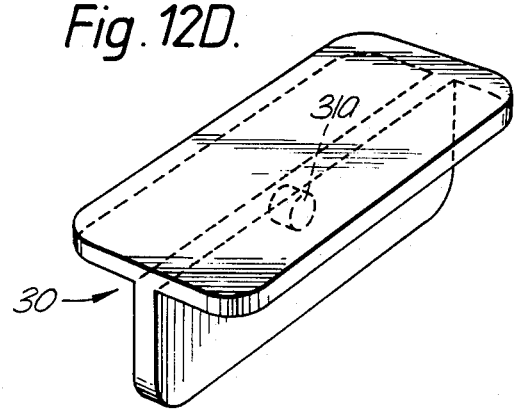
FIGS. 12a, 12b, 12c and 12d show a casing and a component therefore especially useful for a one piece article.
Figure 12A:
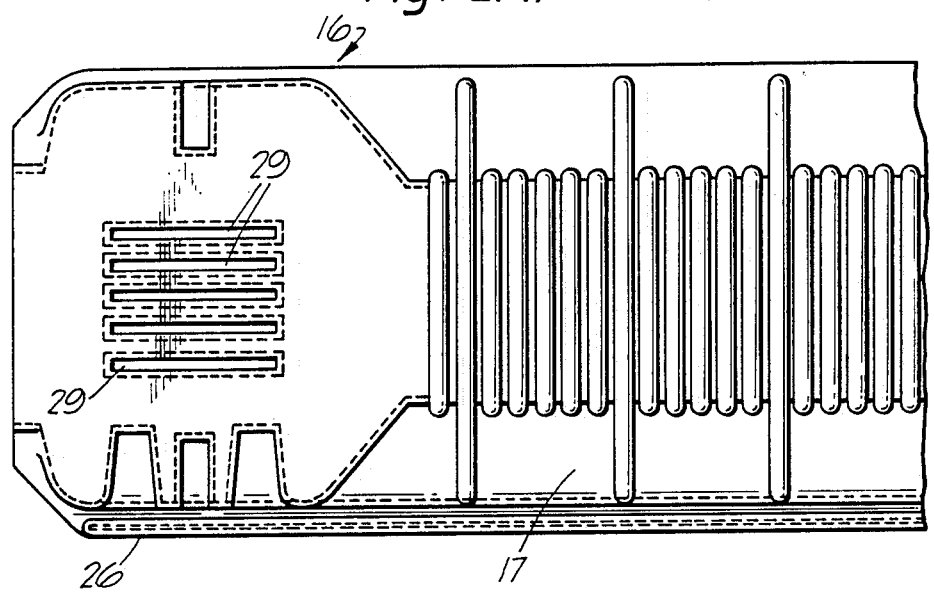
Figure 12B:
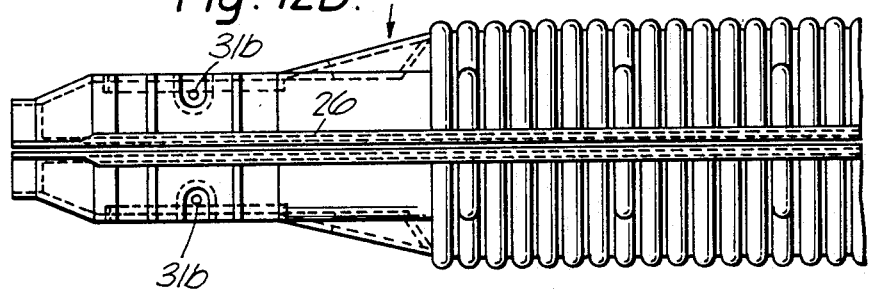
Figure 12C:
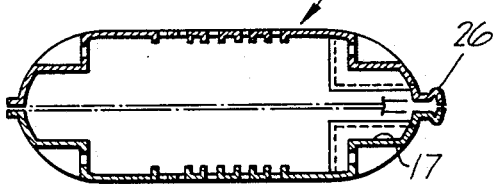

FIGS. 12a, 12b and 12c show a novel casing 16 which may surround the article of the invention, and which is particularly useful as a part of a one-piece article in combination with sealing sheets 8 and 9. FIG. 12a is a partial plan view, FIG. 12b is a partial side elevation and FIG. 12c is an end view from the left hand end as drawn in FIGS. 12a and 12b The casing of FIGS. 12a, 12b and 12c has provision for a holding mechanism for the transverse edges 10 and 11 of the sheets 8 and 9 which is different from (and which may replace) the clips shown in FIGS. 2b, 8a and 8b etc. The means for displacing the sealing material may be as described above, for example a foam or a pressurizable bladder. Nonetheless, some means for holding the edge portions 10 and 11 together will generally have to be provided in order that the foam or bladder displaces the sealing material rather than simply forces the two edge portions apart. This function may be provided by the clamp 14 and clips 15 of FIGS. 2b, 8a and 8b, or by some structural part of the casing 16 such as the surface 17. The casing 16 of FIG. 12 has a surface for holding together the longitudinal edges of the two sheets (not shown in FIG. 12) and has means 29 for holding together the transverse edges, for example either side of the ingoing cables. The casing is provided with several means 29 (five in FIG. 12a) at slightly different positions in order that different cable sizes and different branch-off configurations be accomodated.

Means 29 preferably comprises one or more holes (which term includes slots etc) through the material of the casing and into which can be inserted a rod or plate such as plate 30 illustrated in FIG. 12d; or it may comprise a plate-like or rod-like protrusion on an internal surface of the casing. The plate 30 is inserted into the hole 29, and protrudes into the interior of the casing a sufficient distance to bear, directly or indirectly, on one of the sheets 8 or 9 within the casing. The other sheet may simply bear against the other half of the casing, or a similar plate may be used there too. The plate may act in a similar way to the clips 15 of FIG. 2b, 8a and 8b, and in any case will allow a means for displacing the sealing material to act as desired.

The plate 30 may be retained within the slot 29 by any suitable means while a sealing material is displaced, and activated if appropriate. It may be an interference fit, or any of various catches may be employed, but one solution is that the plate 30 and casing 16 are provided with holes 31a and 31b respectively through which a rod may be inserted to prevent return movement of the plate.

In general, it will be preferred that the casing and sheets be closed around the cable splice, and the plate (or plates) then be inserted, optionally after some heating to soften adhesive at edges of the sheets. Where more than one plate 30 is to be inserted in each casing half best results may be obtained if, after a one plate has been inserted an adjacent cable is moved up against that plate before the next plate is inserted. In some circumstances it may be preferred to insert the plate and then close the casing around the splice. This has the disadvantage, however, that the correct holes 29 may not be selected, and the displacement means may have to be compressed by the action of closing the casing rather than by insertion of the plates. This need not be so where the means for displacing comprises a bladder since that can be pressurized after the casing has been closed, and in that case particularly (but also where the means for displacing comprises a foam) the plates 30 may be integral or otherwise fixed parts of the casing.

An advantage of the plates 30 over the clips 15 is that the sheets 8 and 9 may be fixed, particularly at their edge portions to the casing. If a clip were to be used, an edge of at least one of the sheets would have to be separate, or separable, from the casing in order that a limb of the clip can deform it. Where a plate is used, the material of the sheet may be deformable or a small region of the sheet may simply not be (permanently) secured around the holes 29. In many instances it may however be preferred that only the two longitudinal edges of the sheets be secured to the respective casing halves.

A more important advantage of the plates is that they can easily be inserted after the halves of the casing have been closed. Whilst clips could be inserted through an open end of the closed casing, this is difficult. Thus, where clips are used, we prefer that one of the sheets only is secured to one casing half. Thus the other sheet has to be first folded over the splice, secured with the clips, and the other casing half then fixed in place. This is of course, a more difficult operation than the insertion of plates 30 after a truly one part article has been closed.

Some means, such as a foam block, may be provided to plug any open end to the casing such as is visible in FIG. 12c. Such means will not generally be necessary for sealing the substrate, but may be desirable for further protection of the sheets 8 and 9.

Figure 13A:
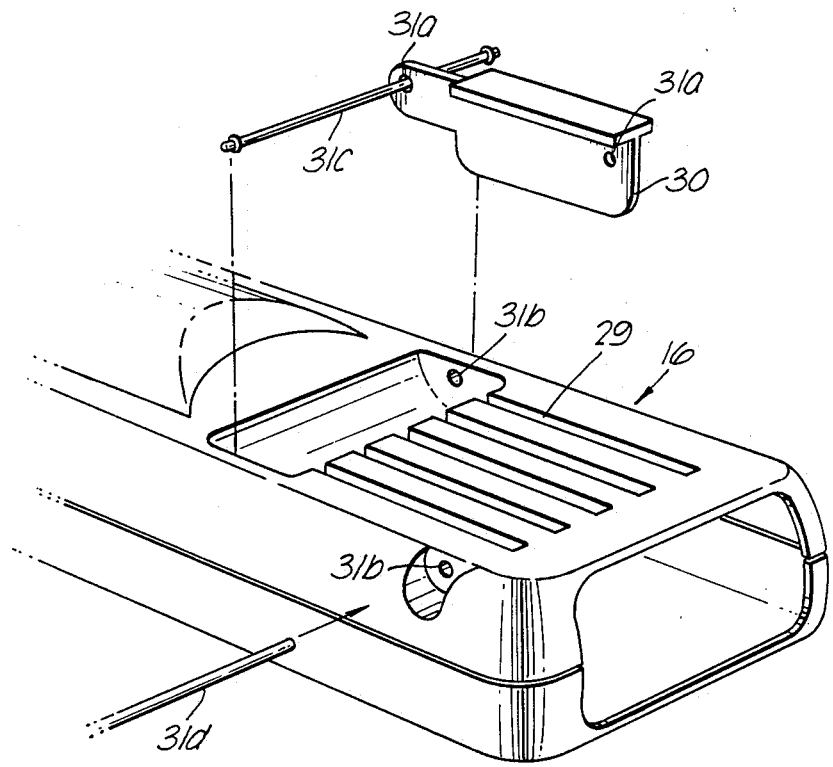
Figure 13B:
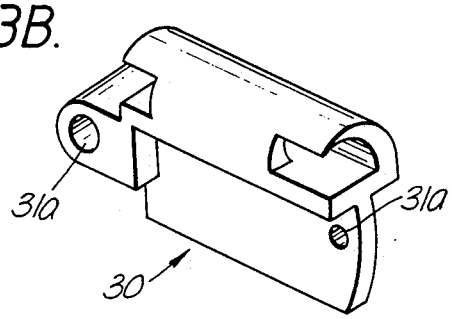

FIG. 13a shows an alternative design of casing 16 to that shown in FIG. 12. Here, plates 30 may be pre-installed in the casing on a rod or other means 31c that allows them to pivot or otherwise move into and out of slots 29. Preferably (as shown) a plate 30 may be moved in the field not only into and out of a given slot 29, but also the slot 29 into which it is to be inserted may be selected in the field according to the cable branch-out configuration to be sealed. This can be acheived in the embodiment illustrated by sliding the plate along rod 31c (shown for clarity positioned above its proper position), and when aligned with the selected slot 29, it is pivoted downwards. When in its final position a second rod or other means 31d is positioned to retain it. A tool may be provided to aid proper installation of the plates, if desired. An alternative design of plate 30 is shown in FIG. 13b. It has cavities at its end, into which a tool may be inserted to aid positioning of the plate.

Thus, a casing may be supplied with a certain number of plates 30 to allow a variety of cable configurations to be sealed.

The number of slots 29 is preferably from 3-12, and generally 4-7 will be preferred.

The slots 29 may be so positioned that a small number thereof, and a small number of plates 30 can seal a variety of branch-out configurations and cable sizes to be sealed. It is desirable that the only decision to be made in the field concerns the type of branch-out configuration, and not the size of cables. Thus, for one cable out, one or more plates 30 are put in certain slots 29; for 2 cables out other slots 29 are used and so on.

One way of achieving this is illustrated in FIGS. 14a, 14b and 14c. These figures are transverse cross-sections through an end of half a casing 16, similar to that illustrated in FIG. 12, but the principle applies also to hinged plates 30 as illustrated in FIG. 13. FIGS. 14a, 14b and 14c illustrate one, two and three cables out respectively. The casing half 16 has four slots 29, and the various possible positions of plates 30 can be seen to be suited to the different branch-out configurations.

FIG. 15 shows a casing half 16 having, in addition to a surface 17 on which longitudinal edge portion of sheet 8 may rest (see FIG. 12), means 32 for sealing an opposite longitudinal edge of sheet to a corresponding edge of the other sheet 9 (not shown). The two sheets 8 and 9, may be integral at this opposite edge, which may then be a fold line, in which case means 32 serves to avoid any leak path between the cable 2A and that fold line.

Figure 16:
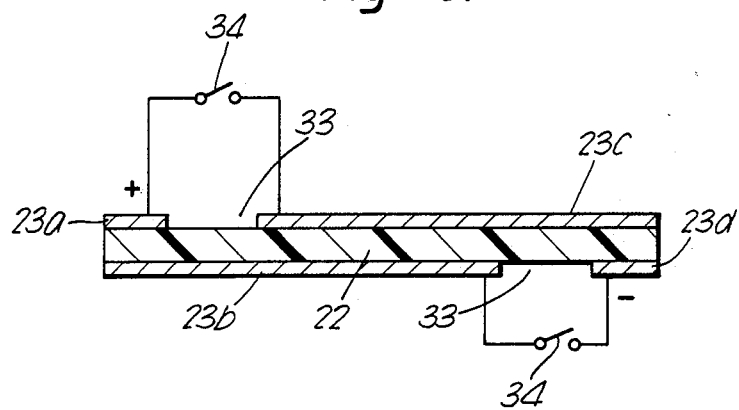
FIG. 16 shows a transverse cross-section of a first electrical strip heater.

FIG. 16 shows in transverse cross-section a first embodiment of a novel heater device that may be used to activate the sealing material. The heater is preferably in strip form, and runs along the edge portions of at least one of the sheets 8 and 9. It preferably comprises a laminate of a PTC conductive polymer composition 22 and metal or other electrodes 23a, 23b, 23c and 23d. Routs 33 may be provided in originally continuous top and bottom electrodes or four separate electrodes may be used. External switches 34 are shown. Thus, zones are provided whose interconnection can change with respect to the power supply between series and parallel. A consequence of this is that the direction of current flow in one of the zones changes by substantially 180° C., ie it reverses.

In general a heating device may change from three or more zones (three as illustrated) in series on initial connection of a power source, ie when current in-rush may be a problem, to three or more zones in parallel at steady state operation. However, two or more than three zones may be provided.

This change may occur automatically, more preferably on the heater device or its surroundings reaching a certain temperature or after expiry of a certain time or after a certain drop in current flow is registered. We prefer that the control mechanism be inherent in the construction of the device, but in addition or instead some other control means may be provided in thermal contact with the device or its surrounding or separate from the device.

For example external switches 34 may be provided that are manually operated by the user of the device, or operated automatically (for example by a power supply), after a certain period of time. When the switches 34 are open, the three zones are in series. Thus the device maybe connected to a source of electrical power as indicated by the + and − signs, and after a certain period of time, or when a certain amount of electrical heating has occurred the user may close the switches to cause connection of the three zones in parallel. Excessive current will not then be a problem if the PTC switching temperature ($T_s$) has been approached or reached because the higher temperature will mean a higher resistivity.

In this way, a current in-rush on initial connection is reduced by a factor of nine due to the lengthy current path, three times the thickness of the composition 22 and the reduced area; and a satisfactorily large steady state heat output is guaranteed by the short current path, a single thickness of the composition 22, of the parallel circuit.

As an alternative to simple manual operation of switches 34, they may be controlled by a clock, by means that senses the temperature of the device or its surroundings or by means that senses a drop in current through the device, or after a certain period of time chosen in advance. Such means may be situated in, or adjacent the device, or where appropriate away from the device, for example within the power supply as mentioned above.

The design illustrated in FIG. 16 may be expected to reduce current in-rush at 24 volts from, say, 200 amps in the case of no routing to, say, less than 30 amps and often to about 10 amps. Such figures may be achieved with a strip heater of 40 cm length, 3 cm width and 1mm thickness.

Figure 17:
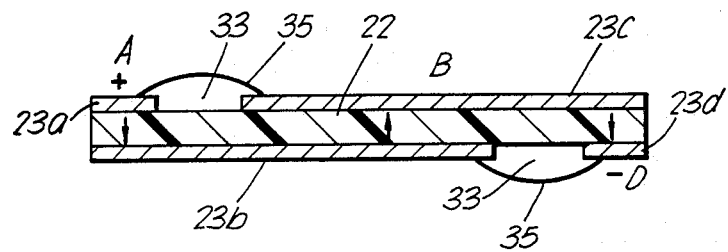
FIG. 17 shows a transverse cross-section of a second electrical strip heater.

FIG. 17 shows in transverse cross-secton a first embodiment of heater. As before the device comprises a PTC composition 22, preferably comprising a conductive polymer, and electrodes 23 on either side of it, optionally with intervening layers of other compositions such as constant wattage compositions. The electrodes are routed as shown at positions 33, or separate electrodes are used with spaces 33, between them. The routs (or gaps) 33 are bridged by means 35. Means 35 may comprise a resistive composition that extends along, preferably continuously along, the routs 33. The means 35 may, however, comprise one or more discrete bridges from one part of the electrode to another part.

We prefer that the means 35 comprises a constant wattage composition, and that the device then functions as follows. When the device is first connected to a source of electrical power, as indicated by the + and − signs, it is at ambient temperature, say about 20° C., which is below the $T_s$ of the composition 22. The resistance of the composition 22 is then low, and the means 35 is chosen to have a resistance between that low resistance and the high temperature resistance of composition 22. Means 35 need not necesssarily have a higher resistivity than composition 22 because the dimensions of the rout may be, and generally will be, much greater than the thickness of compositions 22. However, we prefer the means 35 to have a resistivity of 0.1–100, preferably 2–20 ohm cm, and the composition 22, to have a low temperature resistivity of 2–20 ohm cm. and a high temperature resistivity at about $T_s$ of $10^{3-105}$ ohm cm.

The initial flow of current is therefore as indicated by the arrows; since the means 35 has a resistance much higher than that of the composition 22 the electrical circuit may be considered analogous to that of FIG. 16 with the switches 34 open.

Heat is now generated within the device by $E^2/R$ heating, and the resistance of the composition 22 begins to increase as $T_s$ is approached. At $T_s$ its resistance is greater, preferably considerably greater, than the resistance provided by means 35. The circuit may now be considered to be analogous to that of FIG. 4 with the switches 34 closed. Thus, the three zones, initially connected together in series, automatically become connected together in parallel.

This embodiment may be altered by employing a composition having a negative coefficient of resistance (NTC) as means 35 instead of or in addition to a constant wattage composition. This may produce a sharper transition from series circuitry to parallel circuitry Where an PTC material is used as means 35, a constant wattage composition may be used as composition 22, instead of a PTC material. Alternatively, means 35 may be PTC and composition 22 may be NTC if a change from parallel to series circuitry with increasing temperature is required (or vice versa).

Additional layers may be provided. For example an insulating layer for example of mylar may be provided over the external surfaces of electrodes and constant wattage layers used between the composition 22 and each electrode 23. Such constant wattage layers are preferably 0.0001 to 0.01, especially about 0.008 cm thick, and preferably have a resistivity of 5–10000 especially about 10 ohm cm. The electrodes preferably comprise aluminium, nickel or tin-plated copper foil, for example of thickness 0.001–0.02, especially about 0.0025–0.01 cm.

Figure 18:
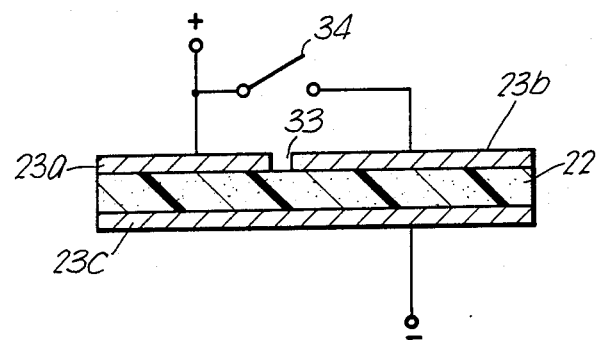
FIGS. 18-20 shows preferred heaters for use with the invention.
Figure 19:
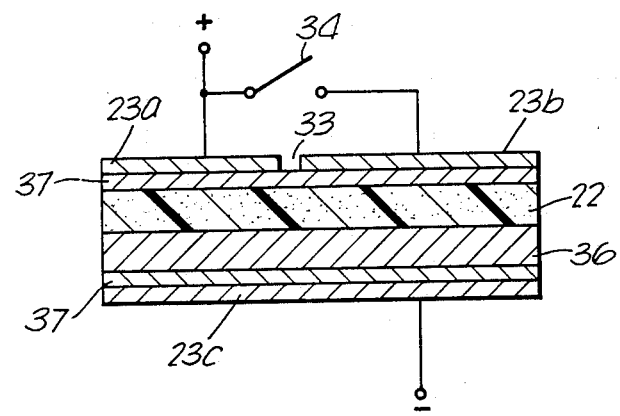
Figure 20:
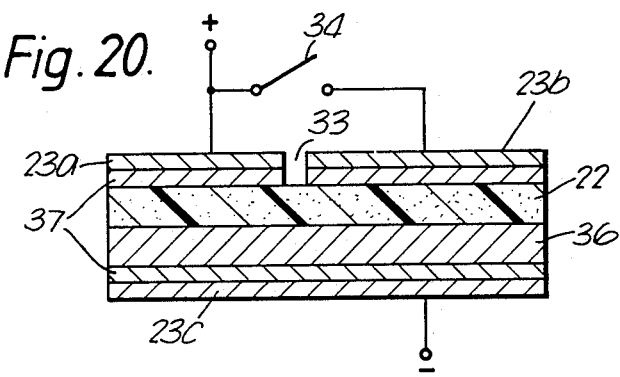

A preferred design of heater is shown in FIG. 18, 19 and 20.

FIG. 18 shows in transverse cross-section a heater in strip form comprising a resistive heating element 22, preferably self-regulating such as a conductive polymer composition, and electrodes 23a, 23b and 23c through which it is powered. The electrodes 23a and 23b are separated by a rout or gap 33, but may be electrically connected by closing switch 34.

An article of the invention may be installed using such a heater to activate an adhesive as follows. Initially, switch 34 is open, and as a result only part of the heater is powered, the left-hand side as illustrated. Since the size of the heater is thus reduced the current inrush will be reduced. The left-hand side of the heater will become hot, and the right-hand side may become somewhat hotter by thermal conduction, and possibly by some diagonal current flow. If a conductive polymer composition or other material exhibiting a positive temperature coefficient of resistance (PTC) is used as material 22, its resistance will rise with time, and current drawn will decrease. After a given time (preferably from 0.5-5, especially about 1 minute) or after a certain resistance or current is noted, switch 34 may be closed. Since more heater is thus brought into operation current will rise again, and there will be a new current peak which will again decrease with time. It is preferred that the time of switching, and the position of electrode gap 33 (which determines the relative size of the two heater portions) are chosen such that the two current peaks are substantially equal, say one is no more than 1.5 times the other. The gap preferably divides the heater into two parts, one preferably being 30-50%, more preferably 35-45% of the total. If desired the heater may comprise more than two portions, for example by providing more than one gap 33. The greatest current peak is preferably less than 75 amps, especially about 50 amps.

The switch may be controlled automatically in the heater, some other part of the article of the invention, or remotely for example in a power supply. Instead of automatic operation it may be thrown manually by the installer of the article.

Preferably the heater self-regulates at a temperature between 100 and 140° C., preferably between 115 and 130° C., especially about 125° C. Its heat output is preferably 0.2 to 2.0, more preferably 0.5 to 1.4, especially 0.75 to 1.3 watts per sq. cm. The lower output will generally apply to the larger sizes of splice case or other article, and the higher output to the smaller sizes.

The power source for this type of heater is preferably a 24V DC battery, but an AC source may be used for example mains power via a suitable transformer.

It is desirable that the heater strip be flexible in order that it can conform to the substrates etc., see for example FIG. 8 where the heater will in general follow the path of the foam 20. The heater is preferably, therefore, thin. A preferred thickness is from 400-1600, more preferably from 500-1000 microns.

The electrodes preferably comprise aluminium or other conductive metal, preferably of a thickness from 10-150, especially about 45 or 100 microns depending on size and whether flexibility is required.

The heating layer 22, preferably comprises a PTC material, preferably having a resistivity before heating of preferably less than 100 ohm cm, more preferably less than 50 om cm, especially 5-30 ohm cm. Its thickness is preferably 50-700, more preferably 200-500 microns.

FIG. 19 shows a more complex design of heater, having additionally a ZTC layer 36. (ZTC means zero temperature coefficient of resistance, which means herein that over the 30° C temperature range of greatest change in resistivity within the temperature range of operation, the resistivity alters by less than a factor of 6.) Such a ZTC layer may contain a thermally conductive filler such as aluminium oxide, preferably in an amount of from 0-75%, more preferably 30-60%, which in addition to improving thermal conductivity may facilitate achievement of a desired resistivity. A resistivity of from 500-10,000 ohm cm, especially 1000 to 7000 ohm cm is preferred. Layer 36 preferably has a thickness of 50-500, especially 200-300 microns.

The heater of FIG. 19 also has two ZTC tie layers 37 between the electrodes 23a, 23b and 23c and the main heating layers 22,36. The function of the tie layer is to aid bonding, and they preferably comprise a polymeric material of resistivity 5-20, especially about 10 ohm cm, and preferably have a thickness of 50-500, especially 50-200 microns.

In FIG. 19 the gap or rout 33 has a depth equal to the electrode material. In FIG. 20, however, the gap 33 extends also through the tie layer 37. It may extend further, and it is possible for the portions of the heater to be entirely separate, merely being electrically connected during installation, although thermal connection is preferred.

Figure 21:
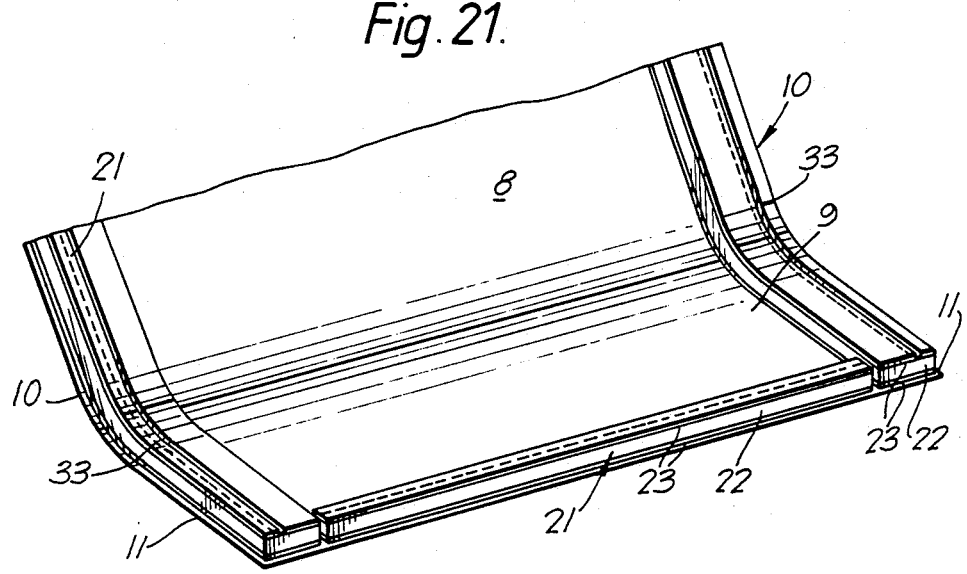
FIG. 21 shows an arrangement of heaters on sheets of the invention.

FIG. 21 shows a way in which heaters 21 may be arranged on sheets 8 and 9. It will be seen that there is one longitudinal edge heater, and two transverse or side edge heaters. They may be electrically connected together by any suitable means. Preferably, the transverse heaters are wider than the longitudinal heaters. Also, the longitudinal heater need not be flexible and may therefore be thicker. In particular it may have thicker electrodes, and act as a bus for the transverse heaters. The transverse heaters preferably have a width of 4-12, especially 5-10 cm depending on the size of the final article. The longitudinal heater preferably has a width of from 1-5, especially 2-3 cms. These widths in general correspond to lengths of 20-100 especially 30-70 cms for the transverse heater, and 50-150, especially 70-120 cms for the longitudinal heater. We have obtained excellent results where the transverse heaters have routs 33, and the longitudinal heater is a simple one zone heater with no rout. All, however, may be routed, and this may be desirable if the longitudinal heater is to act as a bus to routed transverse heaters.

Figure 22A:
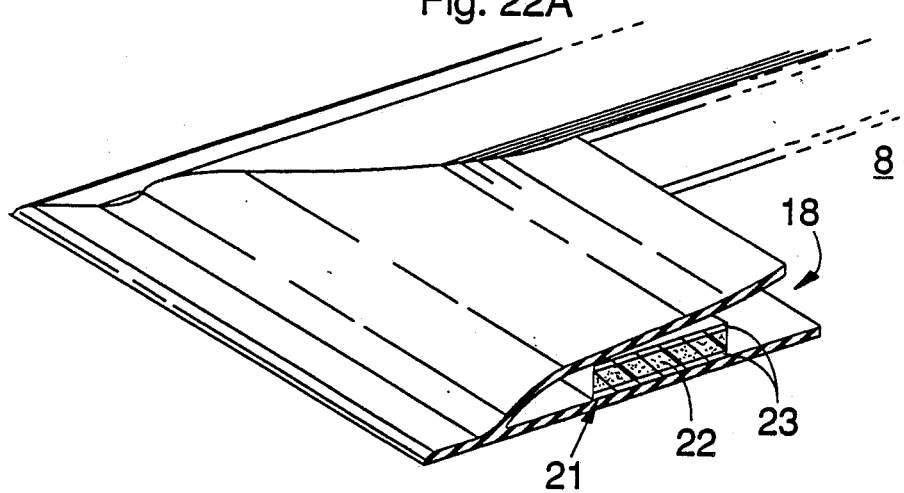
FIGS. 22 and 23 show a safety means for use with the invention.
Figure 22:
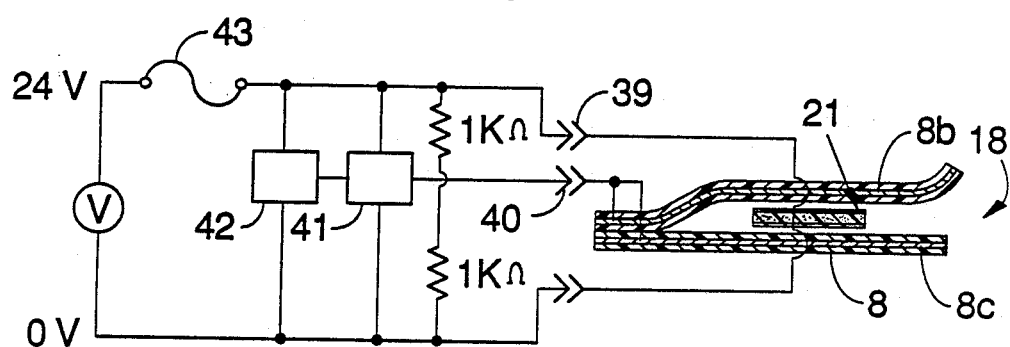

FIGS. 22a and 22b show a novel safety device that may be provided. FIG. 22a shows a sheet 8 with a V-seal 18 at its edge. A heater 21 comprising a PTC heating composition 22 and electrodes 23 is provided within (or otherwise adjacent) the V-seal. The sheet 8 comprises a laminate of various layers (for example as shown in FIG. 11) comprising a polymeric insulating material surrounding conductive sheets 8b and 8c as shown in FIG. 22b. The polymeric insulating material should have a melting point chosen as a maximum temperature that is regarded as safe in the product. Thus, if that temperature is exceeded a fault in the heater is assumed to have occurred, for example due to shorting or application of excessive power. A preferred material for the insulating layer melts at a temperature from 150-275° C., especially 175-250° C. The material may comprise a polyester such as Mylar (trade mark) or nylon. Above the chosen temperature, the material melts and one or both of the electrodes comes into electrical contact with a layer 8h,8c. The electrodes may be powered such that they are at, say, 0 volts ($V_1$), and 24 volts ($V_2$), and the layers 8h and 8c maintained at, say 12 volts ($V_3$). The article of the invention may thus be connected to a power supply by means of a three conductor cable via a plug 39, one of the wires (or other conductor) 40 being connected to layers 8h,8c. Those layers are preferably otherwise substantially entirely electrically insulated from the environment. When a fault occurs the layer 8h,8c becomes polarized to 0 or 24 volts, ie. different from $V_3$, and thus is detected by detection means 41, which then sends a signal to connection means 42 which can short out the power within the power supply causing fuse 43 to blow, or other current cut-off to operate. Thus, the fuse is preferably of a size that it will cause an open circuit if subjected to a voltage substantially equal to the normal operating voltage of the heater. Detection means 41 may comprise an operational amplifier, which responds to an imbalance caused by the fault, and then sends a current pulse to means 42. Means 42 may comprise a thyristor gate which becomes conductive on receiving that current pulse. FIG. 22b is merely schematic and other electrical circuitry may be used.

The safety device may be modified such that the fuse 43 is within the sheet 8 or 9, rather than within the power supply. Thus, if there is a fault the sheet may be rendered impossible to power again, thus preventing further danger if re-use is attempted. This can be done by providing an extra wire to the power supply. Also, the device may be modified so that a two (or more) part heater such as illustrated in FIGS. 18-20 may be powered. Both of these possibilities are illustrated in FIG. 23.

Figure 23:
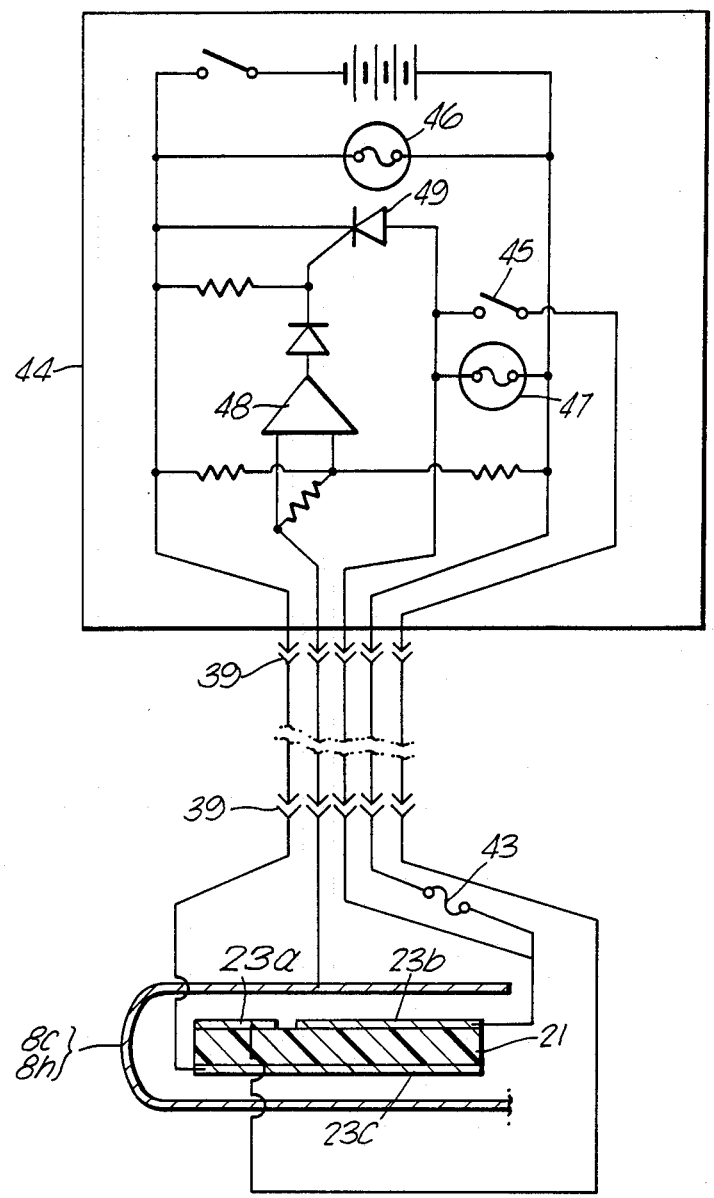

In FIG. 23 a power supply 44 houses a power source, illustrated as a battery, a green light 46 indicating when power is switched on, and a red light 47 indicating a fault. When the power is first switched on, the electrodes 23b and 23c are powered, causing the right-hand side of the heater 21 to heat up. After, say, one minute switch 45 may be manually or automatically closed causing electrode 23a also to be powered.

If a fault occurs an electrode 23a, 23b, 23c will contact conductive layers 8c, 8h causing an imbalance in operational amplifier 48, which then sends a positive current pulse to thyristor gate 49. This causes fuse 43 to blow, thus cutting-off power from the article comprising the heater. It can be seen that the fuse is provided in the article itself. When the fuse 43 is blown, the red light 47 will become powered.

Figure 24:
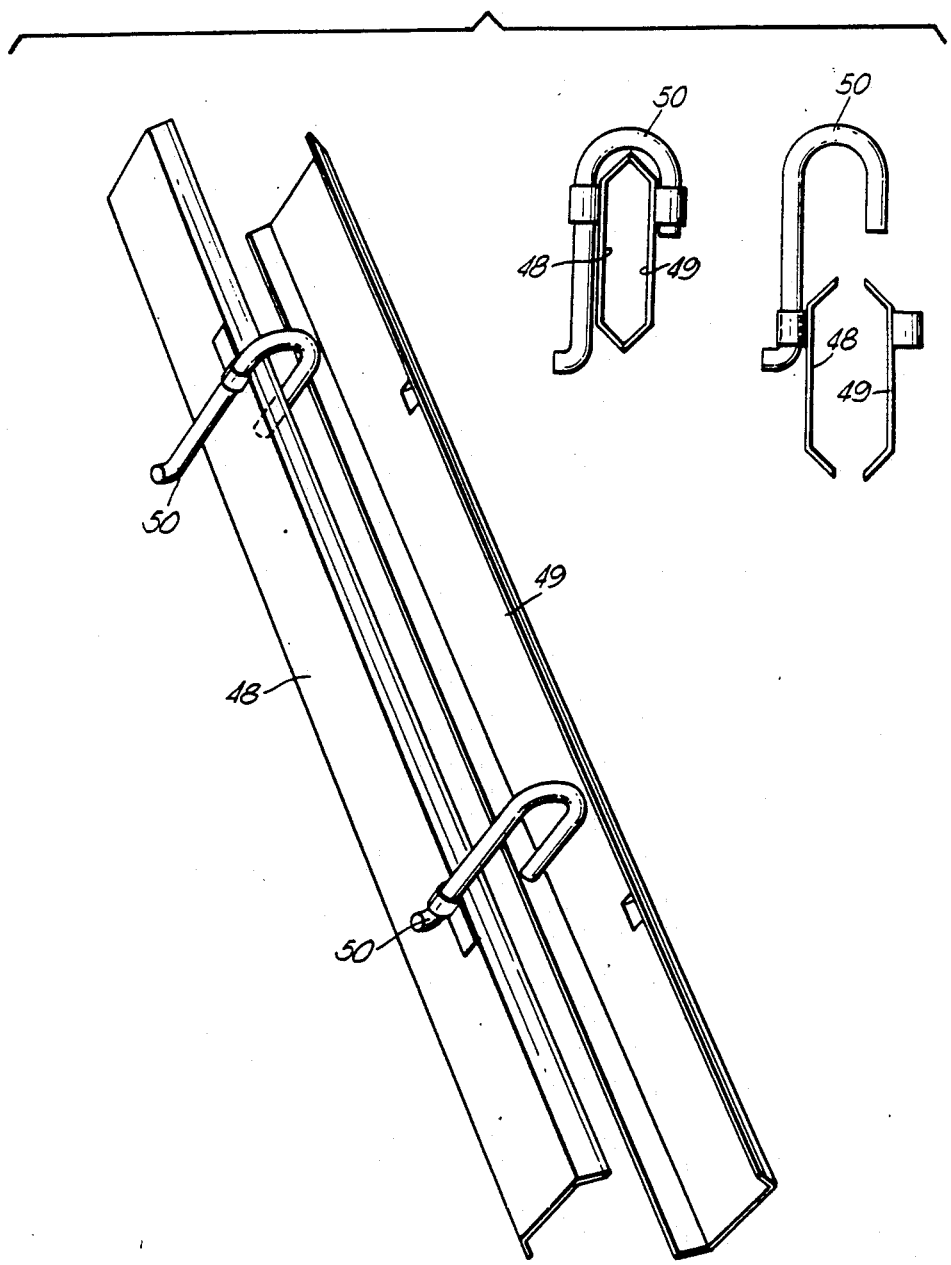
FIG. 24 shows a longitudinal edge clamp.

FIG. 24 shows a multi-part clamp that may replace the single part clamp 14 of FIG. 2b. It comprises parts 48 and 49 that can be forced together by clips 50.

FIG. 25 shows an edge clip 51 having 3 fingers, which can be installed at the edge of sheets 8 and 9 at a fold line between them. We have found that such a clip allows a better seal to be formed around the edge 52 of cable 2 because the cable is able to abut the clip 51 more tightly. The clip may have a middle finger 57 to help retain it in position. In an alternative design, the clip may have 2 fingers, each outside of the sheets 8 and 9, as are the outer legs of the illustrated clip. Instead of an integral middle finger 53 as illustrated, a piece of adhesive (or other sealing material) may be provided at the fold. We have found, surprisingly that the clip remains in position during installation and the fold region becomes successfully sealed. The piece of adhesive may have a thermally conductive core, and in the case of a three-fingered clip, one finger 53 may have an adhesive coating. The finger 41 or the piece of adhesive may comprise a temperature indicator, such as a thermostat that controls a power supply or a mechanical indicator held at a first position by some means (such as heat-softenable adhesive) that is able to relax and visually move when the adhesive softens. A further possibility is provision of a pressure access value at this region.

For the avoidance of doubt it is here stated that the invention provides a cable splice case and various components therefor and a method of sealing a cable splice case by means of a simple flexible sheet of material. The invention may employ any one or more of the features disclosed herein. For example any one or more of the sheet designs, clips, clamps, casing designs, means for displacement, sealing materials or electrical heating devices may be selected.

We claim:

1. An article for environmentally protecting an elongated substrate, which comprises:
   a first sheet having a first edge portion;
   a second flexible substantially planar sheet having a second edge portion;
   a heat-activatable sealing material that can be positioned between the first and second edge portions;
   means for displacing the sealing material to form a seal between the first and second edge portions and around the substrate; and
   a substantially rigid casing that can surround the first and second sheets when the first and second sheets enclose the substrate, said casing includes a hole in the casing so that a rod or plate can protrude through the hole and hold the first and second edge portions together around the substrate.

2. An article according to claim 1, in which the first sheet is flexible and substantially planar.

3. An article according to claim 1, in which the first and second sheets are integral with one another.

4. An article according to claim 1, in which the sealing material comprises a hot-melt adhesive.

5. An article according to claim 1, in which the means for displacing comprises a foam or an inflatable bladder.

6. An article according to claim 1, in which the first and/or second sheet comprises a layer of polymeric material and a layer of metal.

7. An article according to claim 1, in which the first and/or second sheet comprises a layer of metal between two layers of polymeric material.

8. An article according to claim 1, which additionally comprises electrical heating means.

9. An article according to claim 8, in which the heating means is self-regulating.

10. An article according to claim 8, in which the heating means comprises a conductive polymer composition.

11. An article according to claim 8, in which the heating means is in strip form.

12. An article according to claim 11, in which said first and second sheets are integral with one another, the sheets together having a substantially rectangular form, said heater comprising one or more strips that run along three edge portions of the rectangle.

13. An article according to claim 8, in which the heating means is in at least two parts, which can be electrically interconnected from outside the article.

14. An article according to claim 1, in which said first and/or said second sheet has a V-seal at an edge portion thereof.

15. An article according to claim 1, being a telecommunications cable splice case.

16. A substantially rigid casing suitable for surrounding a branched cable splice enclosed by first and second sheets, said casing having means operable from outside the casing for bringing together the first and second sheets between the branching cables wherein the means operable from the outside comprises a hole or opening through which a plate or rod can be inserted to bring together first and second sheets between the branching cables.

17. A casing according to claim 16, which additionally comprises a pivot about which a rod or plate may be pivoted between a first position where it brings together the first and second sheets, and a second position where it does not.

18. A casing according to claim 16, having two or more said holes, said holes being so positioned that different cable branch-out configurations may be accomodated depending on which of said holes receives said rod or plate.

19. A casing according to claim 16, which additionally comprises at least one said rod or plate.

* * * * *

UNITED STATES PATENT AND TRADEMARK OFFICE
CERTIFICATE OF CORRECTION

PATENT NO. : 4,954,670

DATED : September 4, 1990

INVENTOR(S): Jensen, et. al.

It is certified that error appears in the above-indentified patent and that said Letters Patent is hereby corrected as shown below:

Column 7, line 5 replace "tranverse" by--transverse--.
Column 9, line 35 replace "from" by--form--.
Column 9, line 62 before "be" insert--can--.
Column 10, line 51 replace "a" by--an--.
Column 11, line 7, replace "shows" by--show--.
Column 14, line 15 replace "dispaced" by--displaced--.
Column 14, line 29 replace "preferable" by--preferably--.
Column 14, line 33 replace "comprises" by--comprise--.
Column 14, line 59 replace "simple" by--simply--.
Column 15, line 65 replace "5-14 30 by--5-30--.

UNITED STATES PATENT AND TRADEMARK OFFICE
CERTIFICATE OF CORRECTION

PATENT NO. : 4,954,670
DATED : September 4, 1990
INVENTOR(S) : Jensen, et. al.

It is certified that error appears in the above-indentified patent and that said Letters Patent is hereby corrected as shown below:

Column 16, line 6 replace "5.=" by --5-50--.
Column 18, line 61, replace "Routs" by --Routes --.
Column 18, line 68 replace "180°C" by --180°--.
Column 20, line 13 replace "$10^{3-105}$" by --$10^3$-$10^5$--.
Column 20, line 34 replace "an PCT" by --a PCT--.
Column 20, line 41 delete "for example".
Column 21, line 48 replace "om cm" by --ohm cm--.
Claim 7, line 1 replace "claim 7" by --Claim 6--.
Claim 10, line 1 replace "claim 8" by --claim 9--.
Claim 11, line 1 replace "claim 8" by --claim 9--.
Claim 13, line 1 replace 'claim 8" by --claim 9--.

Signed and Sealed this

Twenty-sixth Day of September, 1995

BRUCE LEHMAN

*Attest:*

*Attesting Officer*  *Commissioner of Patents and Trademarks*

UNITED STATES PATENT AND TRADEMARK OFFICE
CERTIFICATE OF CORRECTION

PATENT NO. : 4,954,670
DATED : September 4, 1990
INVENTOR(S) : Jensen, et al

It is certified that error appears in the above-indentified patent and that said Letters Patent is hereby corrected as shown below:

On the title page, item [73] Assignee: "Raychem Corporation, Menlo Park, Calif" should read --NV Raychem SA--.

Signed and Sealed this

Twelfth Day of December, 1995

Attest:

BRUCE LEHMAN

Attesting Officer

Commissioner of Patents and Trademarks